(12) United States Patent
Jang

(10) Patent No.: US 7,515,108 B2
(45) Date of Patent: Apr. 7, 2009

(54) ANTENNA UNIT WITH INCORPORATED TV AND COMMUNICATION ANTENNAS FOR PORTABLE COMMUNICATION TERMINALS AND SIGNAL RECEIVING METHOD THEREOF

(75) Inventor: Hwan-Gee Jang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 947 days.

(21) Appl. No.: 10/967,188

(22) Filed: Oct. 19, 2004

(65) Prior Publication Data

US 2005/0097609 A1    May 5, 2005

(30) Foreign Application Priority Data

| Nov. 4, 2003 | (KR) | ............ 10-2003-0077477 |
| Jan. 17, 2004 | (KR) | ............ 10-2004-0003588 |
| Feb. 6, 2004 | (KR) | ............ 10-2004-0007870 |

(51) Int. Cl.
*H01Q 1/24* (2006.01)
*H01Q 1/36* (2006.01)

(52) U.S. Cl. .................. 343/702; 343/715; 343/725; 343/895

(58) Field of Classification Search ............... 343/702, 343/715, 725, 901, 895; 725/62
See application file for complete search history.

(56) References Cited

U.S. PATENT DOCUMENTS

| 4,646,158 | A * | 2/1987 | Ohno et al. .............. 348/794 |
| 4,809,078 | A * | 2/1989 | Yabe et al. ............... 348/794 |
| 6,414,638 | B1 * | 7/2002 | Egashira .................. 343/702 |
| 6,476,768 | B2 * | 11/2002 | Woo et al. ................ 343/702 |
| 6,501,428 | B1 * | 12/2002 | Blom et al. ............... 343/702 |
| 6,573,870 | B1 * | 6/2003 | Chang ..................... 343/702 |
| 6,756,943 | B2 * | 6/2004 | Kim et al. ................ 343/702 |

FOREIGN PATENT DOCUMENTS

| JP | 2003-309774 | 10/2003 |
| WO | WO 99/54959 | 10/1999 |

* cited by examiner

*Primary Examiner*—Tan Ho
(74) *Attorney, Agent, or Firm*—Roylance, Abrams, Berdo & Goodman, L.L.P.

(57) ABSTRACT

Disclosed herein is an antenna unit with integrated TV and communication antennas for portable communication terminals. The antenna unit comprises a TV antenna and a communication antenna. The TV antenna comprises a rod antenna for receiving a TV signal, and a guide antenna for receiving the TV signal from the rod antenna and transmitting the received TV signal to a TV tuner. The communication antenna comprises a helical antenna for receiving a communication signal, and a connector for receiving the communication signal from the helical antenna and transmitting the received communication signal to a radio frequency (RF) unit.

50 Claims, 28 Drawing Sheets

ANTENNA UNIT WITH INCORPORATED TV AND COMMUNICATION ANTENNAS FOR PORTABLE COMMUNICATION TERMINALS AND SIGNAL RECEIVING METHOD THEREOF

PRIORITY

This application claims priority to an application entitled "ANTENNA UNIT WITH INCORPORATED TV AND COMMUNICATION ANTENNAS FOR PORTABLE COMMUNICATION TERMINALS AND SIGNAL RECEIVING METHOD THEREOF," filed in the Korean Intellectual Property Office on Nov. 4, 2003 and assigned Serial No. 2003-77477, to another application entitled "ANTENNA UNIT WITH INCORPORATED TV AND COMMUNICATION ANTENNAS FOR PORTABLE COMMUNICATION TERMINALS AND SIGNAL RECEIVING METHOD THEREOF," filed in the Korean Intellectual Property Office on Jan. 17, 2004 and assigned Serial No. 2004-3588, and to yet another application entitled "ANTENNA UNIT WITH INCORPORATED TV AND COMMUNICATION ANTENNAS FOR PORTABLE COMMUNICATION TERMINALS AND SIGNAL RECEIVING METHOD THEREOF," filed in the Korean Intellectual Property Office on Feb. 6, 2004 and assigned Serial No. 2004-7870, the contents of which are incorporated herein by reference.

BACKGROUND OF THE INVENTION

1. Field of the Invention

The present invention relates to an antenna unit for portable communication terminals. More particularly, the present invention relates to an antenna unit with integrated TV and communication antennas for portable communication terminals, which is capable of receiving a TV broadcast signal as well as a communication signal. Also, the present invention relates to a signal receiving method of the same.

2. Description of the Related Art

Portable communication terminals have become popular. As a consequence, multi-functional communication terminals have been developed which satisfy various desires of the consuming public in addition to the conventional simple audio communication function. The desired multiple functions include a video-on-demand (VOD) function, a video communication function, a digital camera function, an Internet function, a TV function, etc.

A portable communication terminal with the above-mentioned TV function is a device that allows a user to watch TV broadcast programs using a display unit of the portable communication terminal in addition to the communication function.

The portable communication terminal with the TV function has at least two radio frequency (RF) units, since a frequency band necessary for audio and data transmission/receipt is different from a frequency band necessary for TV broadcasting. As a result, the portable communication terminal has various operation modes, such as a phone mode, a standby mode, and a TV mode. The TV mode is an image-receiving mode combined with the standby mode. An antenna, which receives conventional TV broadcast signals, is connected to a TV tuner in the portable communication terminal. Another antenna, which transmits/receives audio signals, is connected to a duplexer.

The construction of the portable communication terminal with the TV function is very complicated, since the portable communication terminal requires the TV antenna to receive the TV broadcast signals as well as the communication antenna to transmit/receive the audio signals, as compared to the construction of the conventional portable communication terminal exclusively used to transmit/receive audio signals. Specifically, the two antennas, i.e., the TV antenna and the communication antenna, are separately mounted in the portable communication terminal with the TV function comprising a single terminal body, which causes the following problems.

Firstly, the TV antenna and the communication antenna are separately mounted in the single terminal body of the portable communication terminal with the result that miniaturization of the terminal body of the portable communication terminal is very difficult.

Secondly, the construction of the antenna unit, and thus the entire construction of the portable communication terminal, is very complicated, since the TV antenna and the communication antenna are separately mounted in the single terminal body of the portable communication terminal, which increases the manufacturing costs of the portable communication terminal.

Thirdly, the portable communication terminal is not aesthetically pleasing, since the TV antenna and the communication antenna are separately mounted in the single terminal body of the portable communication terminal. This is because the TV antenna and the communication antenna are constructed in the shape of conventional retractable antennas. The TV antenna is extended from the terminal body of the portable communication terminal when a user watches a TV program on the portable communication terminal. It is predicted that the aesthetic appearance of portable communication terminals may be critical to product marketing in the future.

Fourthly, the portability of the portable communication terminal is decreased, since the TV antenna and the communication antenna are separately mounted in the single terminal body of the portable communication terminal. This is because the TV antenna and the communication antenna are constructed in the shape of conventional retractable antennas, and the antennas are extended from the terminal body of the portable communication terminal when they are used. The antenna unit of the portable communication terminal comprises a helical antenna and a rod antenna, which are well known.

Fifthly, the TV antenna and the communication antenna may be easily damaged when the portable communication terminal is dropped, since the TV antenna and the communication antenna are separately mounted in the single terminal body of the portable communication terminal. The portable communication terminal is frequently dropped. When the portable communication terminal is dropped, the antenna unit, comprising TV antenna and communication antennas, is easily damaged or broken because the antenna unit is extendable from the terminal body of the portable communication terminal.

SUMMARY OF THE INVENTION

Therefore, the present invention has been made in view of the above problem, and it is an object of the present invention to provide an antenna unit with integrated TV and communication antennas for portable communication terminals and a signal receiving method thereof.

It is another object of the present invention to provide an antenna unit with integrated TV and communication antennas to reduce the size of terminal bodies of portable communication terminals and a signal receiving method thereof.

It is another object of the present invention to provide an antenna unit with integrated TV and communication antennas for portable communication terminals that can be economically manufactured and a signal receiving method thereof.

It is another object of the present invention to provide an antenna unit with integrated TV and communication antennas for portable communication terminals that is aesthetically pleasing and a signal receiving method thereof.

It is another object of the present invention to provide an antenna unit with integrated TV and communication antennas for portable communication terminals that has improved portability and a signal receiving method thereof.

It is another object of the present invention to provide an antenna unit with integrated TV and communication antennas for portable communication terminals that is not easily damaged or broken when it is dropped and a signal receiving method thereof.

It is yet another object of the present invention to provide an antenna unit with integrated TV and communication antennas for portable communication terminals that individually receives a TV signal and a communication signal and a signal receiving method thereof.

In accordance with one aspect of the present invention, the above and other objects can be accomplished by the provision of an antenna unit for portable communication terminals with a TV function, the antenna unit comprising a rod antenna for receiving a TV signal; and a guide antenna for receiving the TV signal from the rod antenna and transmitting the received TV signal to a tuner.

In accordance with another aspect of the present invention, there is provided an antenna unit for portable communication terminals with a TV function. The antenna unit comprises a TV antenna having a rod antenna for receiving a TV signal, and a guide antenna for receiving the TV signal from the rod antenna and transmitting the received TV signal to a TV tuner; and a communication antenna having a helical antenna for receiving a communication signal, and a connector for receiving the communication signal from the helical antenna and transmitting the received communication signal to a radio frequency (RF) unit.

In accordance with another aspect of the present invention, there is provided a method of separately receiving a TV signal and a communication signal from an antenna of a portable communication terminal. The method comprises the steps of receiving the TV signal through a rod antenna when the TV signal is received; transmitting the received TV signal to a TV tuner through a guide antenna; receiving the communication signal through a helical antenna when the communication signal is received; and transmitting the received communication signal to a radio frequency (RF) unit through a connector.

In accordance with another aspect of the present invention, there is provided an antenna unit for portable communication terminals each comprising a terminal housing and an antenna housing mounted to the terminal housing. The antenna unit comprises a TV antenna having a retractable rod antenna disposed in the terminal housing such that the retractable rod antenna can be retracted/extended into/from the terminal housing, a conductive tube connected to the retractable rod antenna, the conductive tube being disposed in the longitudinal direction of the terminal housing, and an antenna connecting and holding member attached to the end of the conductive tube; a communication antenna part integrally attached to the TV antenna while being disposed coaxially to the TV antenna; and an insulator formed in the longitudinal direction of the communication antenna for isolating the TV antenna and the communication antenna from each other.

In accordance with another aspect of the present invention, there is provided an antenna unit for portable communication terminals each comprising a terminal housing and an antenna housing mounted to the terminal housing. The antenna unit comprises a TV antenna having a retractable rod antenna disposed in the terminal housing such that the retractable rod antenna can be retracted/extended into/from the terminal housing, a conductive tube connected to the retractable rod antenna, the conductive tube being disposed in the longitudinal direction of the terminal housing, and an antenna connecting and holding member to electrically connect the conductive tube with a printed circuit board; a communication antenna integrally attached to the TV antenna while being disposed coaxially to the TV antenna; contact connection members mounted below the communication antenna for disposing the TV antenna part coaxially to the communication antenna; and an insulator formed in the longitudinal direction of the communication antenna for isolating the TV antenna and the communication antenna from each other.

In accordance with another aspect of the present invention, there is provided an antenna unit for portable communication terminals. The antenna unit comprises a TV antenna having a retractable rod antenna retractable/extendable in the longitudinal direction of an antenna housing for receiving a TV signal, and a conductive tube connected to a stopper of the retractable rod antenna for transmitting the received TV signal; a communication antenna coaxially surrounding the TV antenna for transmitting/receiving a communication signal; a first insulator extending in the longitudinal direction of the communication antenna for isolating the TV antenna and the communication antenna from each other; and a first contact connection member integrally attached to the conductive tube in the longitudinal direction of the communication antenna for contacting the stopper of the retractable rod antenna and the end of the conductive tube below the communication antenna.

In accordance with yet another aspect of the present invention, there is provided an antenna unit for portable communication terminals. The antenna unit comprises a retractable rod antenna retractable/extendable in the longitudinal direction of a communication antenna for receiving a TV signal; a conductive tube connected to a stopper of the retractable rod antenna for transmitting the received TV signal, the conductive tube having a predetermined length; a first insulator extending in the longitudinal direction of the retractable rod antenna and the communication antenna for isolating the retractable rod antenna and the communication antenna from each other; a contact connection member integrally attached to the conductive tube in the longitudinal direction of the communication antenna for contacting the stopper of the retractable rod antenna and the end of the conductive tube below the communication antenna; a second insulator attached to the lower end of the contact connection member; a ground part attached to the lower end of the second insulating part; and a connection terminal connected to the conductive tube for transmitting the received TV signal to a printed circuit board.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Embodiments of the present invention will now be described in detail with reference to the accompanying drawings. In the following, a detailed description of known functions and configurations incorporated herein will be omitted for conciseness.

Figure 1:
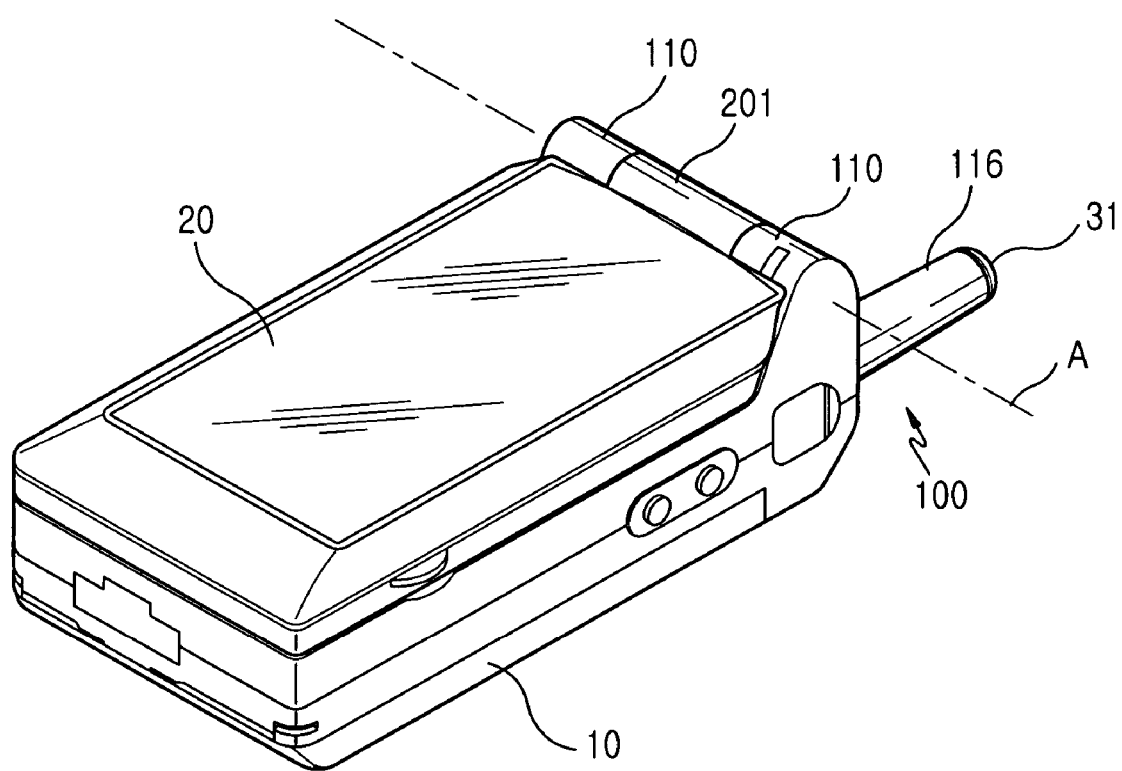
FIG. 1 is a perspective view of a portable folder-type communication terminal having an antenna unit and a folder part in a closed position in accordance with an embodiment of the present invention.
Figure 2:
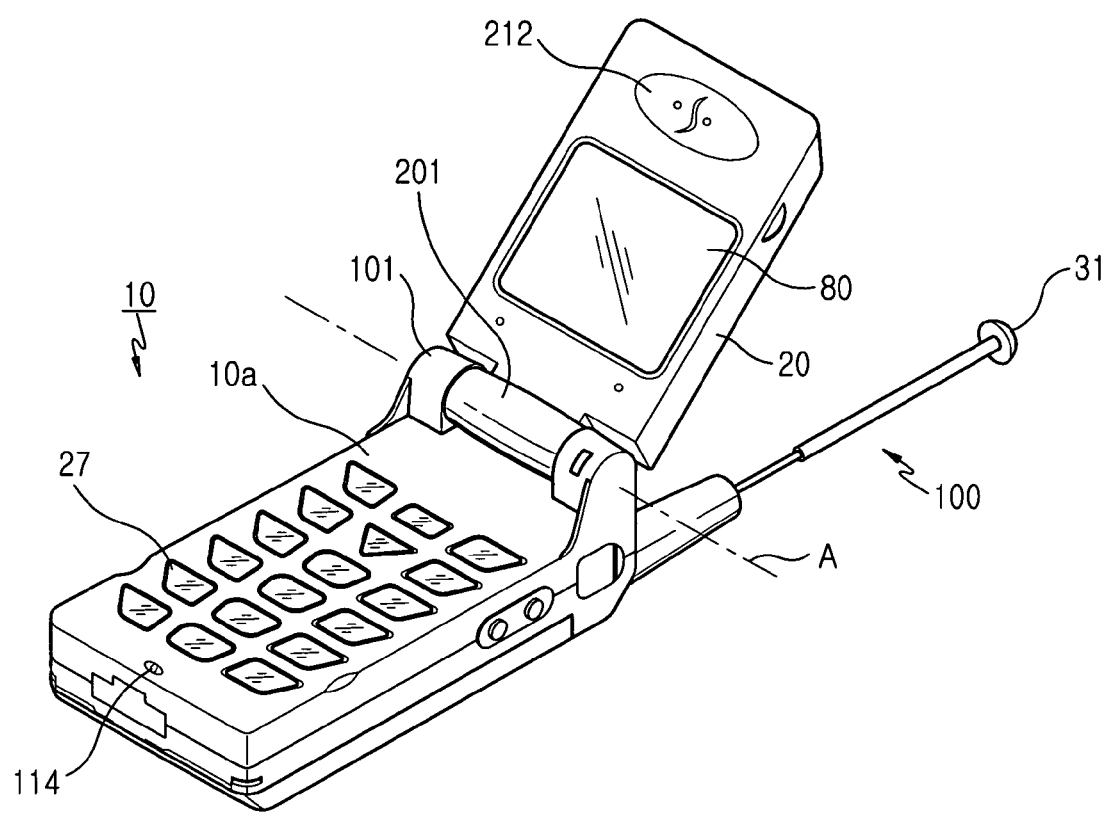
FIG. 2 is a perspective view of the portable folder-type communication terminal in which the antenna unit and the folder part in an open position in accordance with an embodiment of the present invention.

FIGS. 1 and 2 show a portable communication terminal with an antenna unit 100 in accordance with the third embodiment of the present invention. The portable communication terminal is a folder-type communication terminal. A description of the present invention will be given hereinafter under the assumption that the antenna unit according to an embodiment of the present invention is adopted in the folder-type communication terminal, although the present invention is applicable to any type of portable communication terminal. FIG. 1 shows the portable communication terminal when a folder part 20 of the portable communication terminal is in contact with a terminal housing 10 of the portable communication terminal, i.e., the folder part 20 is closed. FIG. 2 shows the portable communication terminal when the folder part 20 is rotated about a hinge axis A from the terminal housing 10, i.e., the folder part 20 is opened.

The portable communication terminal further comprises a hinge unit to connect the folder part 20 to the terminal housing 10 such that the folder part 20 can be rotated about the hinge axis A from the terminal housing 10 in addition to the terminal housing 10 and the folder part 20. A hinge module of the hinge unit is mounted in a center hinge housing 201, and is therefore not shown in the drawings.

Figure 3A:
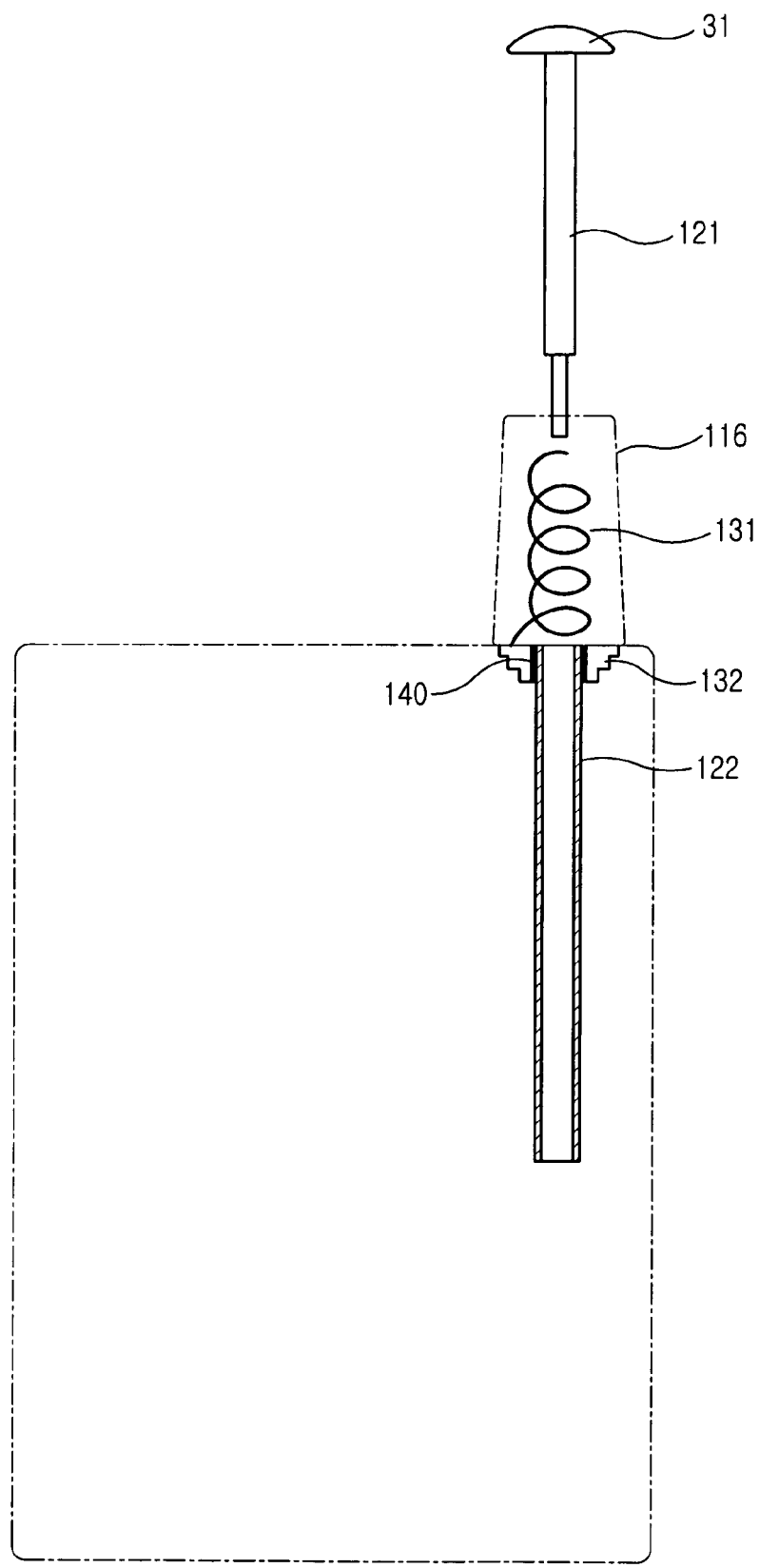
FIG. 3A is a view showing a rod antenna of the antenna unit extended from the portable communication terminal in accordance with an embodiment of the present invention.
Figure 3B:
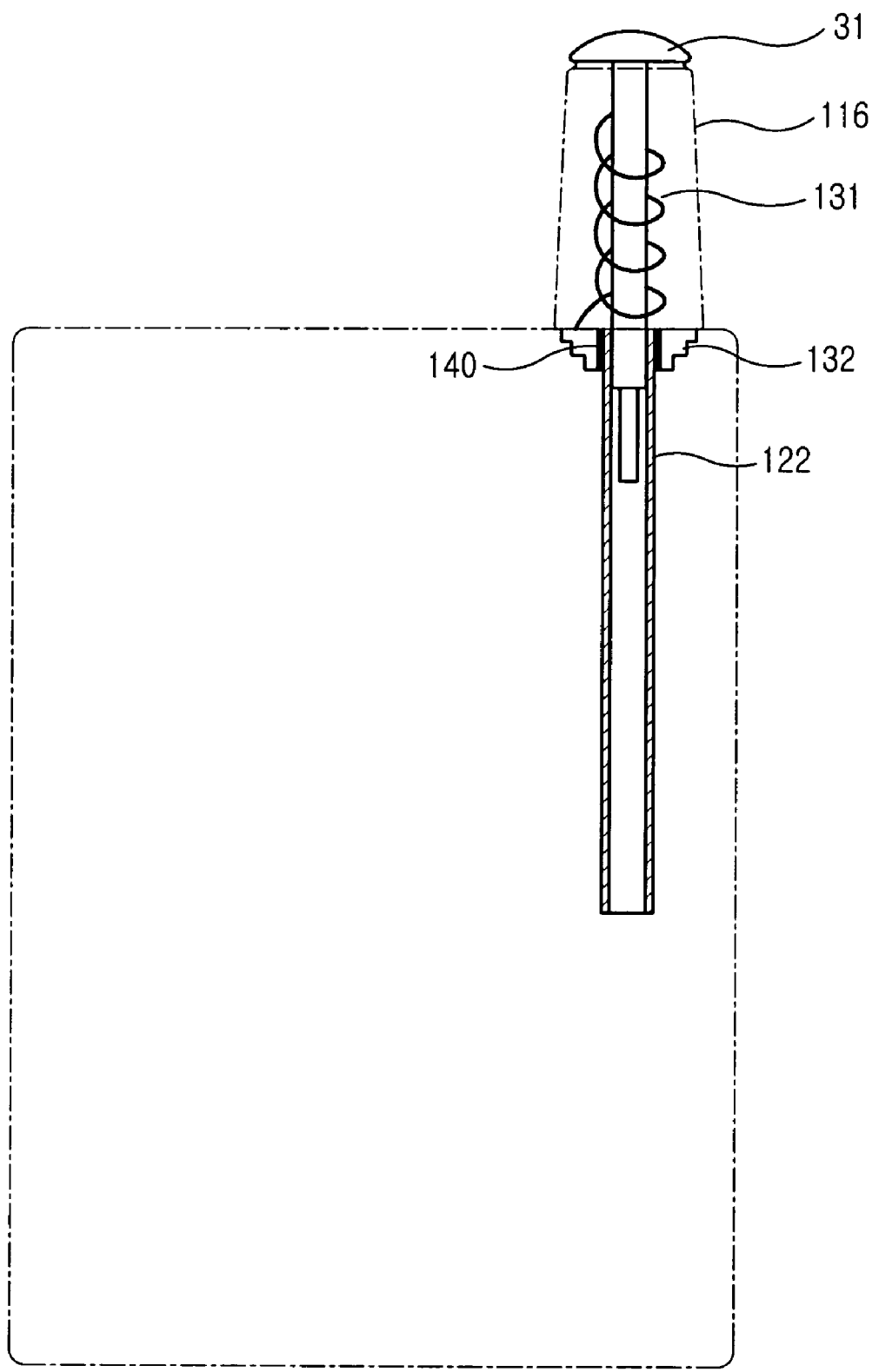
FIG. 3B is a view showing the rod antenna of the antenna unit retracted into the portable communication terminal in accordance with an embodiment of the present invention.

An antenna unit 100 is mounted to the terminal housing 10. The terminal housing 10 is provided at the upper surface 10a thereof with two opposite side hinge arms 110, a keypad 27 comprising a plurality of keys, and a microphone 114. The folder part 20 is provided at the lower surface thereof with a speaker 212 and a display unit 80. Referring now to FIGS. 3A and 3B, the antenna unit 100 comprises a rod antenna 121; a guide antenna 122 mounted in the terminal housing 10 for receiving a TV signal from the rod antenna; a helical antenna 131 mounted in an antenna housing 116; and a connector 132 for receiving a communication signal from the helical antenna 131. The rod antenna 121 is not shown in FIG. 1, which shows the antenna housing 116 and an antenna cap 31, since the rod antenna 121 is retracted. FIG. 2 shows the rod antenna 121 extended from the terminal housing 10.

Figure 4:
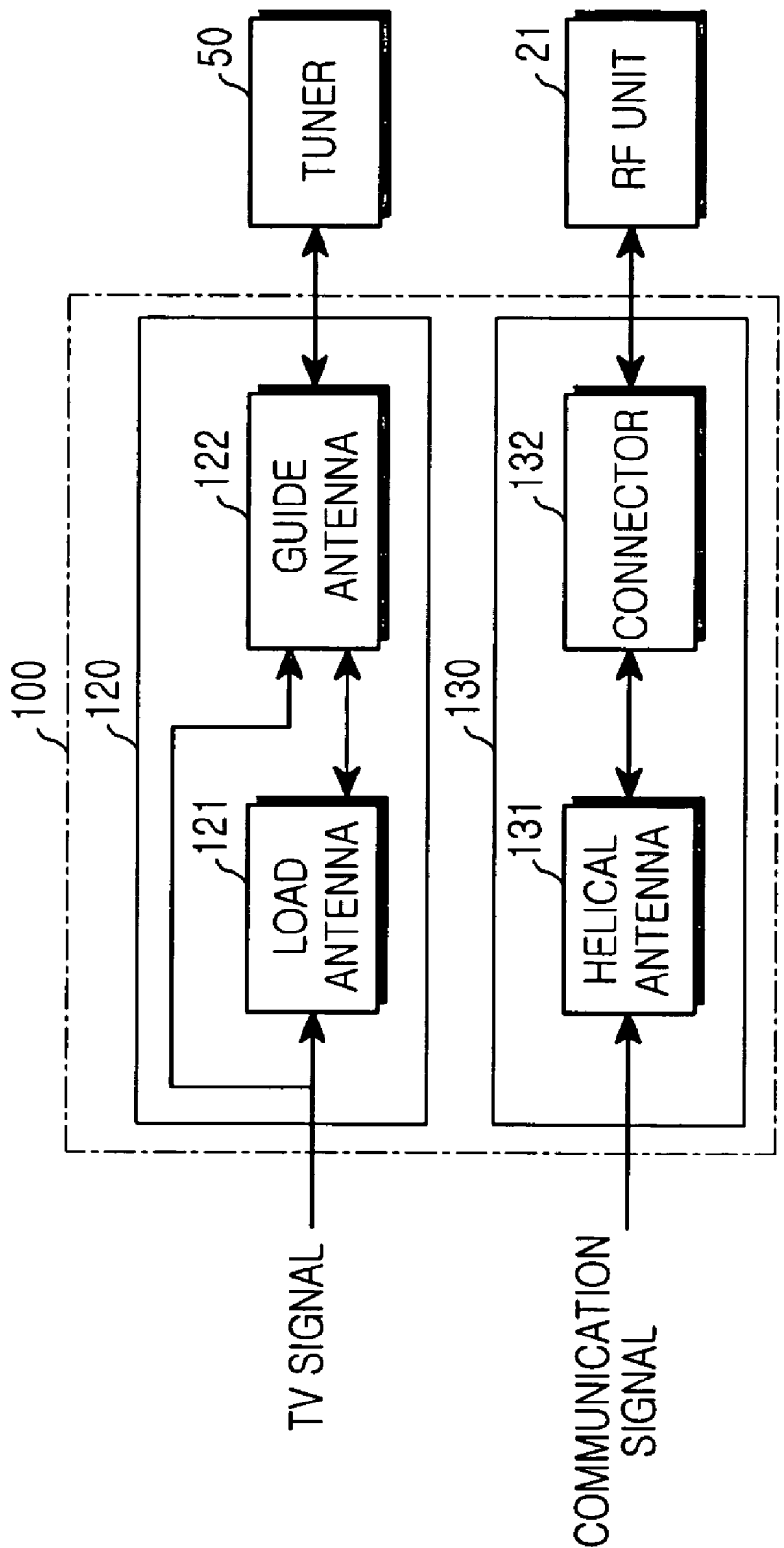
FIG. 4 is a block diagram showing the construction of an antenna unit for portable communication terminals in accordance with an embodiment of the present invention.

The construction of the antenna unit according to an embodiment of the present invention will now be described with reference to FIGS. 3 and 4. As shown in FIGS. 3 and 4, the antenna unit 100 comprises a TV antenna part 120 having the rod antenna 121 and the guide antenna 122; a communication antenna part 130 comprising the helical antenna 131 and the connector 132; and an insulation part 140.

The rod antenna 121 of the TV antenna part 120, which receives a TV signal, is inserted though the helical antenna 131 of the communication antenna part 130 such that the rod antenna 121 can be retracted/extended into/out of the antenna housing 116. The guide antenna 122 of the TV antenna part 120 is disposed inside the connector for transmitting the TV signal received by the rod antenna 121 to a TV tuner 50. The guide antenna 122 may directly receive the TV signal and transmit it to the TV tuner 50 when the rod antenna 121 is retracted. When the rod antenna 121 is extended as shown in FIG. 3A, the TV signal is received by the rod antenna 121, and the received TV signal is transmitted to the TV tuner 50 via the guide antenna 122. When the rod antenna 121 is retracted as shown in FIG. 3B, the TV signal is received by the guide antenna 122, which transmits the received TV signal to the TV tuner 50.

The helical antenna 131 of the communication antenna part 130 is disposed in the antenna housing 116 for receiving a communication signal. The communication signal includes audio and data. The connector 130 transmits the communication signal received from the helical antenna 131 to a radio frequency (RF) unit 21. The insulation part 140 is disposed between the connector 132 and the guide antenna 122 inserted into the connector 132 for insulating the TV antenna part 120 and the communication antenna part 130 from each other.

Figure 5:
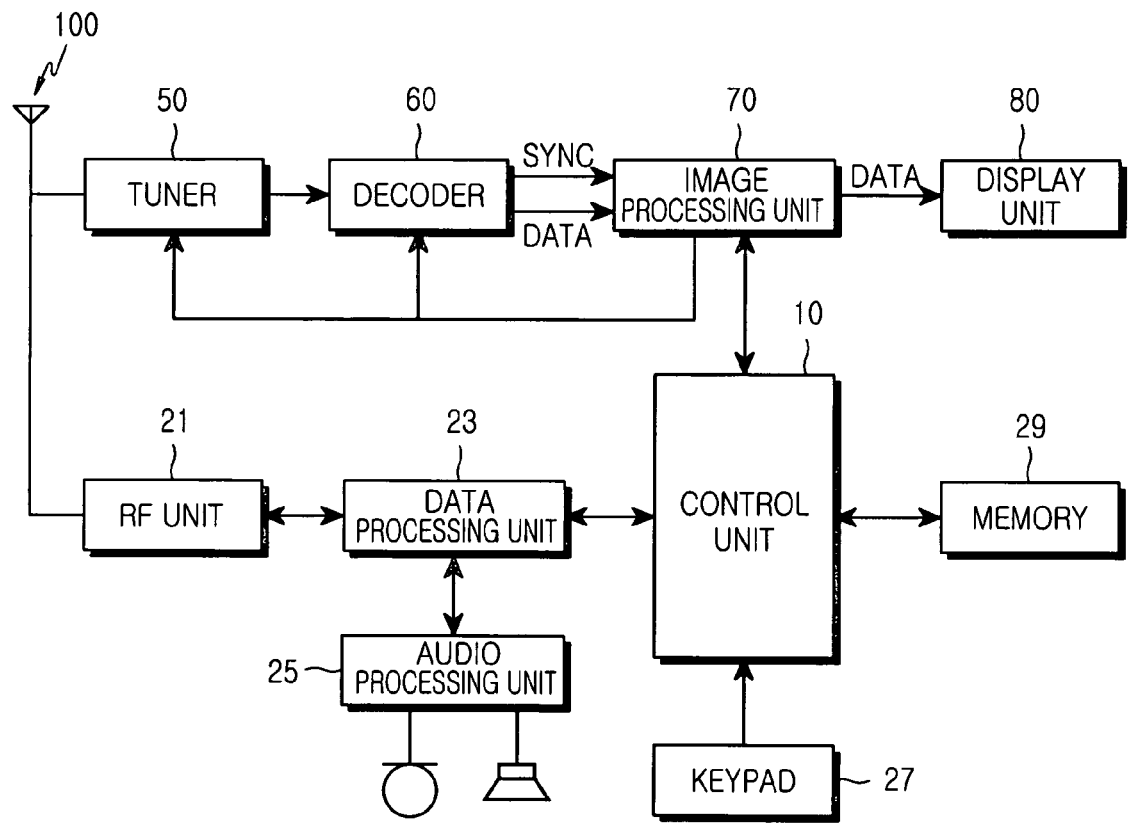
FIG. 5 is a block diagram showing the construction of a portable communication terminal with the antenna unit in accordance with an embodiment of the present invention.

FIG. 5 is a block diagram showing the construction of the portable communication terminal having the antenna unit in accordance with an embodiment of the present invention. As shown in FIG. 5, the antenna unit 100 receives the TV signal as well as the communication signal including audio and data. The TV signal is transmitted to the tuner 50 via the TV antenna part 120 of the antenna unit 100 (see FIG. 4). When the communication signal is received, the communication signal is transmitted to the RF unit 21 via the communication antenna part 130 of the antenna unit 100 (see FIG. 4).

The RF unit 21 performs wireless communication for the portable communication terminal. The RF unit 21 comprises an RF transmitter for increasing and amplifying the frequency of the signal to be transmitted; and an RF receiver for amplifying the received signal while reducing noise and decreasing the frequency of the amplified signal. In the an embodiment of the present invention, the RF unit 21 performs wireless communication through a communication signal received from the communication antenna part 130 of the antenna unit 100.

A data processing unit 23 comprises a transmitter for encoding and modulating the signal to be transmitted; and a receiver for demodulating and decoding the received signal. Specifically, the data processing unit 23 comprises a modem and a codec. An audio processing unit 25 reproduces an audio signal output from the data processing unit 23 or transmits an audio signal generated from the microphone to the data processing unit 23.

The keypad 27 comprises numeral and character information input keys; and function keys. In an embodiment of the present invention, the keypad 27 comprises various mode-setting keys, which are used to process the TV image signal. A memory 28 may comprise a program memory and a data memory. The program memory stores programs that control general operations of the portable communication terminal and programs that process the TV image signal according to an embodiment of the present invention. The data memory temporarily stores data generated when the programs are operated.

A control unit 10 controls the general operation of the portable communication terminal. The control unit 10 may include the data processing part 23. In an embodiment of the present invention, the control unit 10 sets an image processing unit 70 to a TV mode when the mode is changed by the keypad 27, and performs a controlling operation such that the TV image signal received from the TV antenna part 120 of the antenna unit 100 is displayed according to the set TV mode. In an embodiment of the present invention, the control unit 10 performs a controlling operation such that wireless communication is performed on the basis of the communication signal received from the communication antenna part 130 of the antenna unit 100.

The tuner 50 receives the TV image signal of the channel selected under the control of the control unit 10 from the TV antenna part 120, and changes the frequency of the received TV image signal. A decoder 60 demodulates and decodes the TV image signal output from the tuner 50. The decoder 60 decodes the TV image signal to output color signals (R, G, B) and synchronizing signals (horizontal and vertical synchronizing signals). The image processing unit 70 performs data communication with the control unit 10 and performs a signal processing operation for displaying the TV image signal output from the decoder 60 under the control of the control unit 10. The image processing unit 70 processes the image signal output from the decoder 60 and user data output from the control unit 10, and outputs them to the display unit 80. The user data includes current time, remaining battery power, reception sensitivity, and status data based on the state change of the TV mode. The image processing unit 70 processes the TV signal based on the frame size and outputs the processed TV signal. The TV image signal and the user data are individually output.

The display unit 80 displays the data output from the control unit 10 when the communication mode is on. When the TV mode is on, the display unit 80 displays the TV image data output from the image processing unit 70 and user data at the respective corresponding areas. When the TV mode is on, the display unit 80 displays the TV image signal output from the image processing unit 70 at a first display area and the user data at a second display area. The display unit 80 may be a liquid crystal display (LCD). In this case, the display unit 80 may comprise a LCD controller, a memory to store image data, and a LCD display element. When the LCD is constructed in the form of a touch screen, the keypad 27 and the LCD may serve as an input unit.

Wireless communication of the portable communication terminal will now be described with reference to FIGS. 1 to 5. When a user dials using the keypad 27 and presses a communication key in a signal-transmitting mode, the control unit 10 recognizes the action, processes the dial information received from the data processing unit 23, converts it into an RF signal through the RF unit 21, and the converted RF signal through the communication antenna part 130 of the antenna unit 100. When a person to whom the user has transmitted a communication signal responds to the communication signal transmitted by the user, the response is received through the communication antenna part 130, and the control unit 10 detects the received communication signal through the RF unit 21 and the data processing unit 23. As a result, an audio communication channel is formed through the audio processing unit 25 so that the user can perform wireless communication. When a communication signal is received through the communication antenna part 130 in a signal-receiving mode, the control unit 10 recognizes the signal-receiving mode through the data processing unit 23, and generates a ring signal through the audio processing unit 25. When the user replies to the communication signal, the control unit 10 recognizes it, and an audio communication channel is formed through the audio processing unit 25 so that the user can perform wireless communication. The audio communication is described in the signal-transmitting mode and the signal-receiving mode as described above, although packet data and image data may also be transmitted and received. When the standby mode is on or text communication is performed, the control unit 10 displays the text data process through the data processing unit 23 on the display unit 80.

The TV-mode operation of the portable communication terminal will now be described with reference to FIGS. 1 to 5. When a user selects the TV mode, the control unit 10 informs the image processing unit 70 that the TV mode is selected. Correspondingly, the image processing unit 70 outputs control data to the tuner 50 to select a channel, and drives the decoder 60. The tuner 50 is tuned to a channel corresponding to the channel control data output from the image processing unit 70. The TV image signal received over the tuned channel is received through the TV antenna part 120 of the antenna unit 100, and the frequency of the TV image signal is converted. The TV image signal with converted frequency is output to the decoder 60. The decoder 60 decodes the received TV image signal to output RGB analog image signals and synchronizing signals (horizontal and vertical synchronizing signals). The decoder 60 separates color signals from the received composite image signal and outputs the separated color signals. The decoder 60 may be an NTSC-type decoder.

Figure 6:
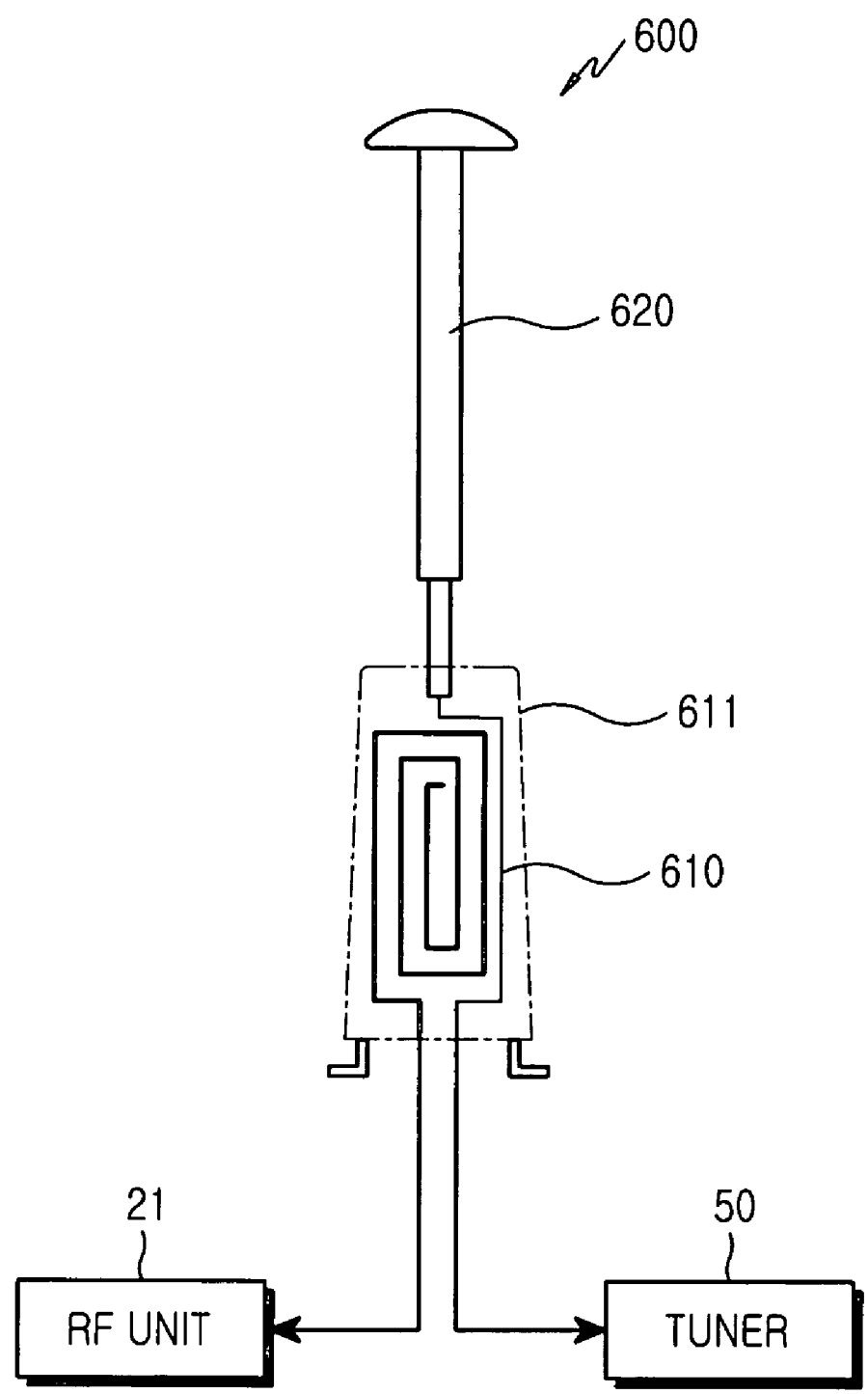
FIG. 6 is a view of an antenna unit in accordance with another embodiment of the present invention.

FIG. 6 is a view of an antenna unit 600 according to another embodiment of the present invention. As shown in FIG. 6, the antenna unit 600 comprises a folded antenna 610 attached to one side of the interior of an antenna housing 611 and a rod antenna 620 inserted though the center of the folded antenna 610 such that the rod antenna 620 can be retracted/extended. The folded antenna 610 is an exclusive communication antenna that receives only a communication signal. The folded antenna 610 transmits the received communication signal to the RF unit 21. The rod antenna 620 is an exclusive TV antenna that receives only a TV signal. The rod antenna 620 transmits the received TV signal to the tuner 50. Wireless communication based on the communication signal received from the RF unit 21 and a TV-mode operation based on the TV signal received from the tuner 50 are identical to those described in connection with the previous embodiment of the present invention.

The mechanism of the antenna unit with integrated TV and communication antennas according to an embodiment of the present invention will be described hereinafter in detail.

Figure 7:
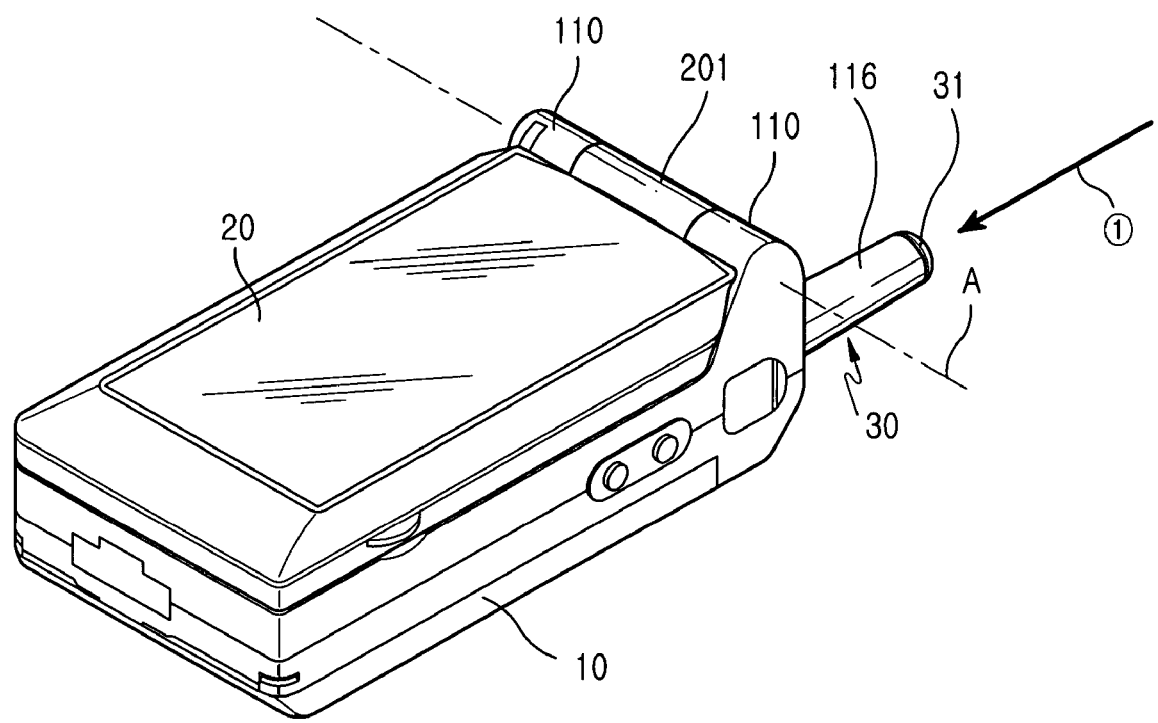
FIG. 7 is a perspective view of a portable folder-type communication terminal having an antenna unit and a folder part in a closed position.
Figure 8:
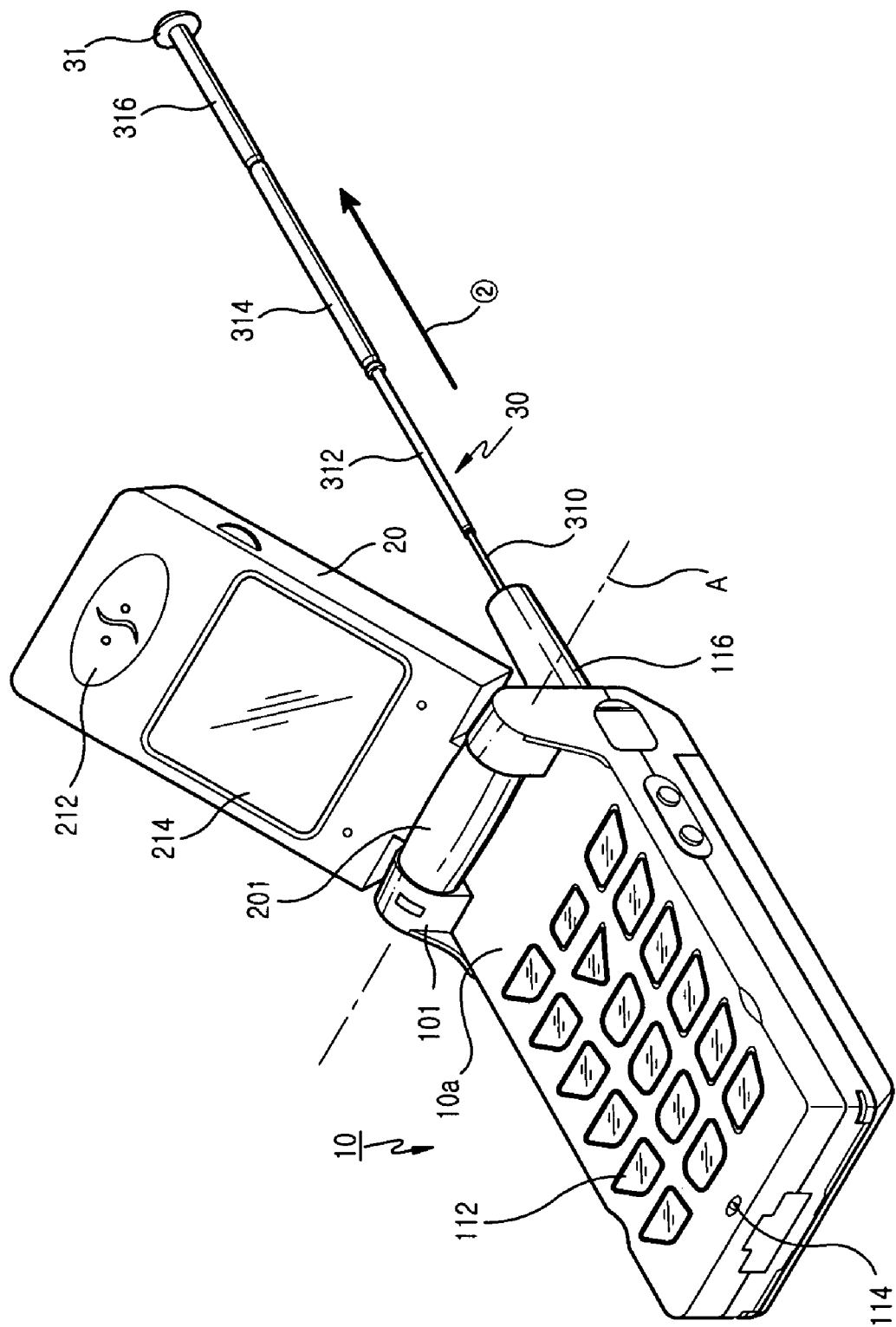
FIG. 8 is a perspective view of the portable folder-type communication terminal of FIG. 7 showing the folder part being fully opened and a retractable rod antenna being fully extended.

FIGS. 7 and 8 show a portable folder-type communication terminal in which an antenna unit according to a first embodiment of the present invention is adopted. The portable communication terminal is a folder-type communication terminal. A description of the present invention will be given assuming that the antenna unit according to an embodiment of the present invention is adopted in the folder-type communication terminal, although the present invention is applicable to any type of portable communication terminal.

FIG. 7 is a perspective view showing the portable communication terminal when a folder part 20 of the portable communication terminal is in contact with a terminal housing 10 of the portable communication terminal, i.e., the folder part 20 is closed. FIG. 8 is a perspective view showing the portable communication terminal when the folder part 20 is rotated about the hinge axis A from the terminal housing 10, i.e., the folder part 20 is opened. A retractable rod antenna 30 of the antenna unit is fully extended in FIG. 8.

The portable communication terminal comprises a terminal housing 10, a folder part 20, a hinge unit to connect the folder part 20 to the terminal housing 10 such that the folder part 20 can be rotated about a hinge axis A from the terminal housing 10, and an antenna unit mounted to the terminal housing 10. A hinge module of the hinge unit is mounted in a center hinge housing 201, and is therefore not shown in the drawings.

To the terminal housing 10 is mounted an antenna unit with integrated TV and communication antennas. The terminal housing 10 is provided at the upper surface 10a thereof with two opposite side hinge arms 110, a key array 112 comprising a plurality of keys, and a microphone 114. The folder part 20 is provided at the lower surface thereof with a speaker 212 and a display unit 214.

The retractable rod antenna 30 of the antenna unit is retracted/extended into/out of an antenna housing 116 of the terminal housing 10. Preferably, the retractable rod antenna 30 is retracted/extended through multiple steps. The antenna unit according to an embodiment of the present invention, specifically the retractable rod antenna 30 of the TV antenna part, is fully retracted and extended in FIGS. 7 and 8, respectively. First, second and third rod antenna members 316, 314, 312 and 310 of the retractable rod antenna 30 are shown in FIG. 8. The direction of the arrow ① in FIG. 7 indicates the direction in which the retractable rod antenna 30 is retracted, and the direction of the arrow ② in FIG. 8 indicates the direction in which the retractable rod antenna 30 is extended.

Figure 9:
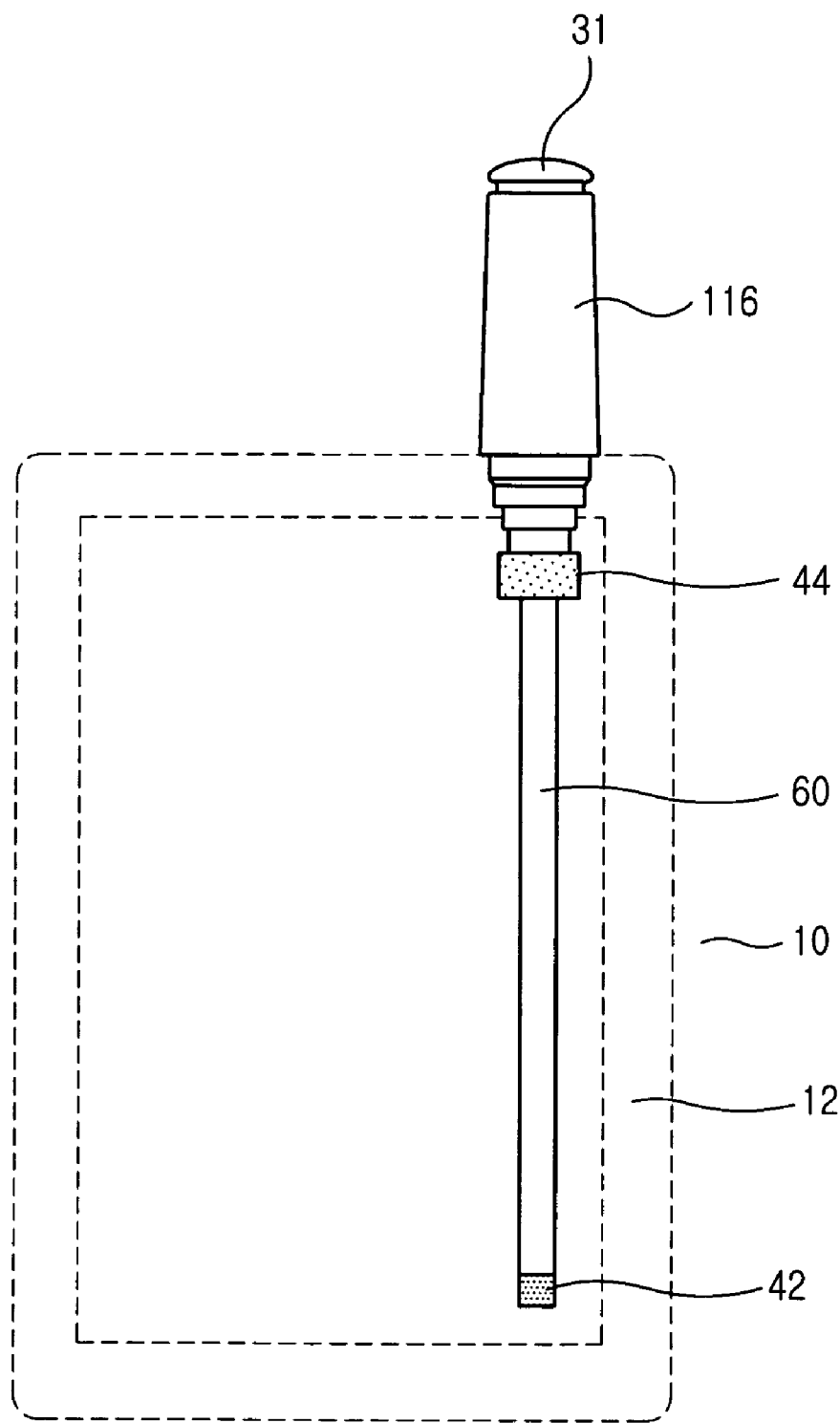
FIG. 9 is a front view showing the antenna unit mounted in a terminal housing of the portable communication terminal in accordance with an embodiment of the present invention.
Figure 10:
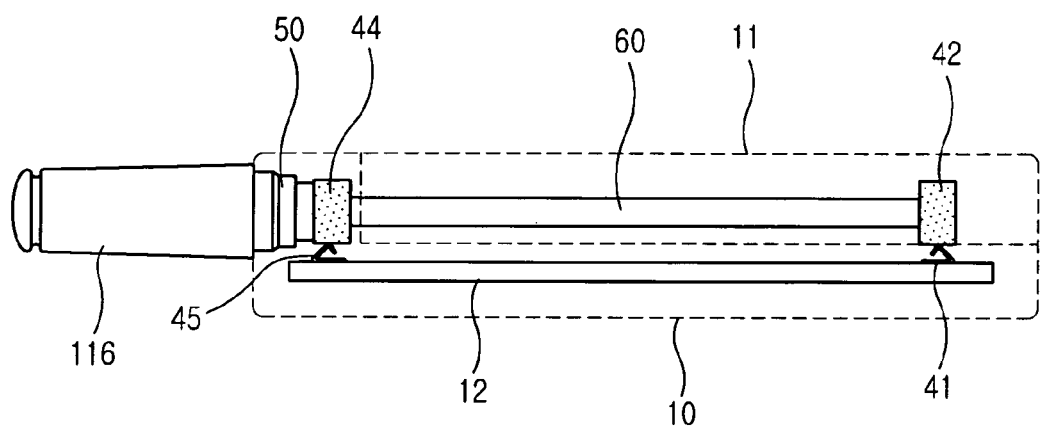
FIG. 10 is a side view showing the antenna unit mounted in the terminal housing of the portable communication terminal in accordance with an embodiment of the present invention.

As shown in FIGS. 9 and 10, an antenna unit according to an embodiment of the present invention comprises integrated TV and communication antenna parts. This is advantageous in that the portable communication terminal is miniaturized, assembly is easily accomplished, aesthetically pleasing appearance is provided, and portability is improved. Specifically, the TV antenna part comprises: rod antenna members, which comprise the retractable rod antenna 30 (See FIGS. 13A to 13C); a conductive tube 60 connected to the retractable rod antenna 30; an antenna connecting and holding member 42 that electrically connects the conductive tube 60 to a printed circuit board 12 to transmit received image signals. The antenna connecting and holding member 42 holds the end of the conductive tube and transmits the received image signals.

The communication antenna part comprises a helical antenna 120; a contact connection member 50 connected to the lower end of the helical antenna 120; and an antenna bushing 44 attached to the contact connection member 50. The antenna bushing 44 is electrically connected to the printed circuit board 12 for transmitting communication signals to the printed circuit board 12. Specifically, the antenna bushing 44 is connected to an RF unit (not shown) of the printed circuit board 12.

The helical antenna 120, which is disposed in the antenna housing 116, is not shown in FIGS. 9 and 10. Also, the rod antenna members of the retractable rod antenna are not shown in FIGS. 9 and 10, since they are also disposed in the antenna housing 116 and the conductive tube 60. Accordingly, only the antenna cap 31, which is disposed at the upper end of the antenna housing 116, is shown.

The antenna housing 116 is disposed at the upper end of the terminal housing 10 such that it can be extended outwardly in the longitudinal direction of the terminal housing 10. The conductive tube 60 is also disposed in the terminal housing 10 in the longitudinal direction of the terminal housing 10. The metal contact connection member 50, which is integrally attached to the lower end of the antenna housing 116, is connected to the printed circuit board 12 by means of the antenna bushing 44 and a connection terminal 45. The other end of the conductive tube 60 is electrically connected to the printed circuit board 12 by means of the antenna connecting and holding member 42 and another connection terminal 41.

The antenna connecting and holding member 42 is disposed at the lower end of the terminal housing 10, and the antenna bushing 44 is disposed at the upper end of the terminal housing 10. Specifically, the antenna connecting and holding member 42 and the antenna bushing 44 is spaced apart from each other by the length of the conductive tube 60. The antenna bushing 44 transmits communication signals transmitted/received by means of the helical antenna 120 to the printed circuit board 12 via the metal contact connection member 50. The conductive tube 60 comprises a copper pipe, and the length of the conductive tube 60 is less than that of the terminal housing 10.

Figure 16:
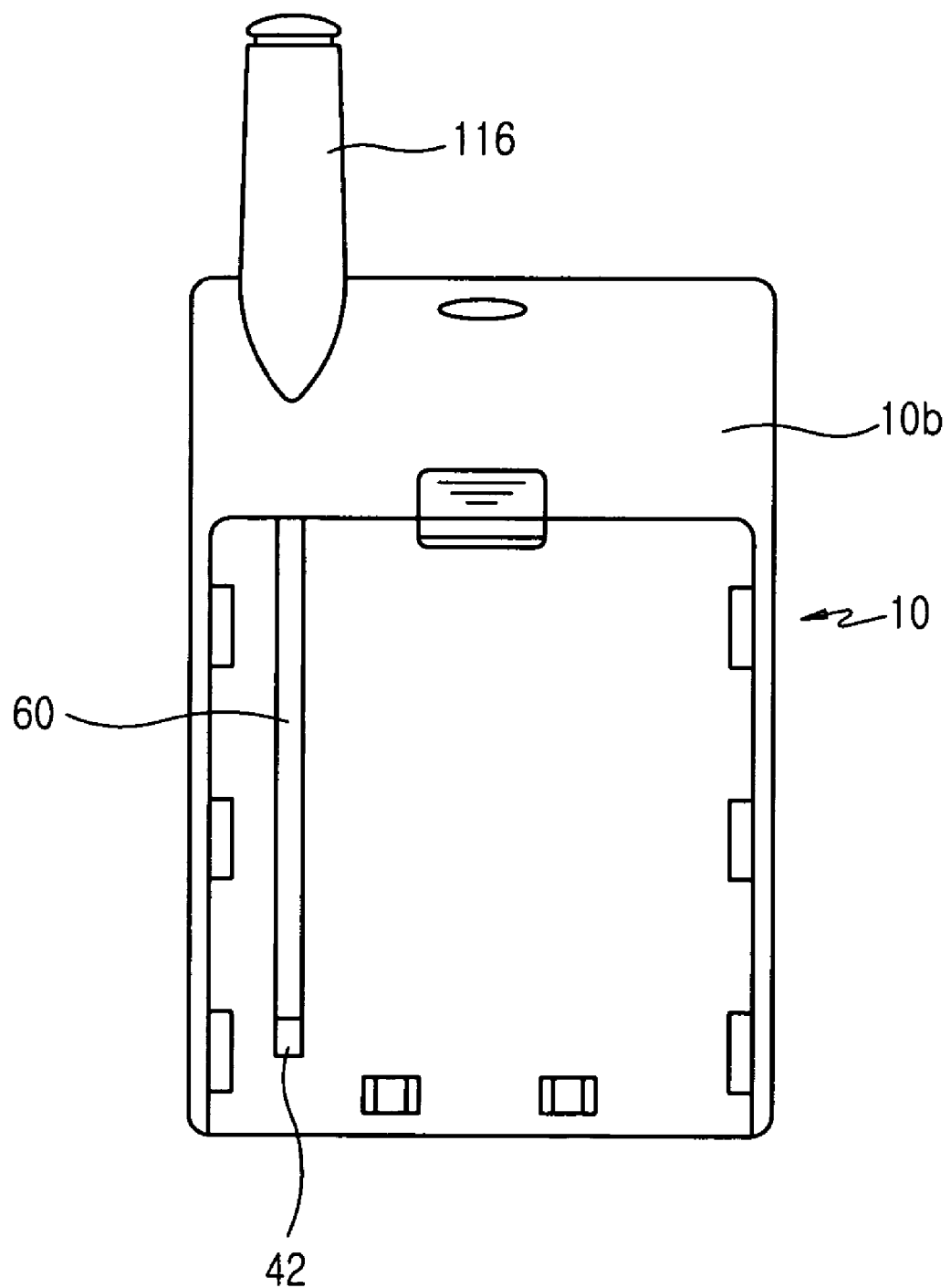
FIG. 16 is a rear view of the terminal housing of the portable communication terminal in which the antenna unit with a battery pack removed in accordance with an embodiment of the present invention.

Preferably, the conductive tube 60 and the antenna connecting and holding member 42 are exposed when the battery pack 11 is removed from the terminal housing 10, which is shown in FIG. 16.

Figure 11:
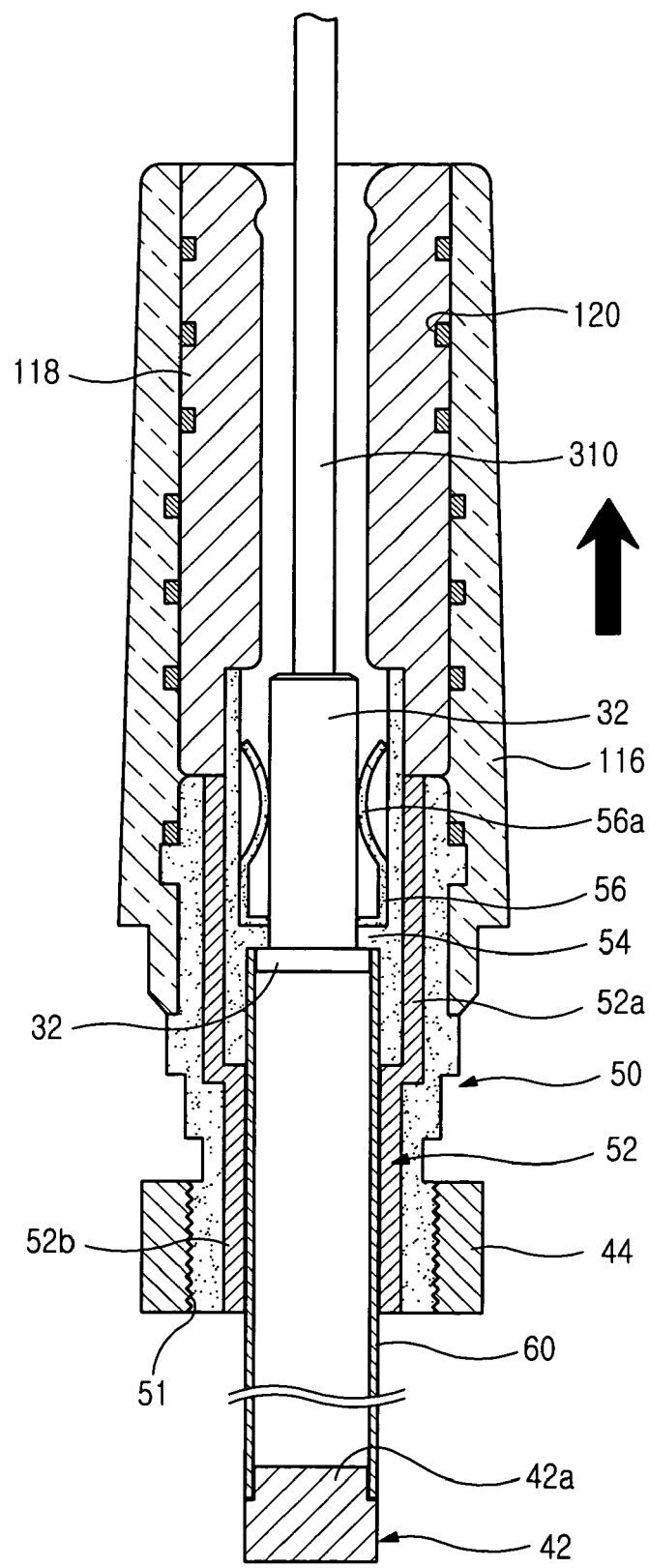
FIG. 11 is a longitudinal sectional view showing the construction of the antenna unit with a retractable rod antenna fully extended in accordance with an embodiment of the present invention.

The construction of the antenna unit with integrated TV and communication antennas according to the first embodiment of the present invention will now be described in detail with reference to FIGS. 11 and 12. FIG. 11 shows that the retractable rod antenna 30 of the antenna unit is fully extended from the antenna housing 116 of the terminal housing, and FIG. 12 shows that the retractable rod antenna 30 of the antenna unit is fully retracted into the antenna housing 116 of the terminal housing.

Figure 12:
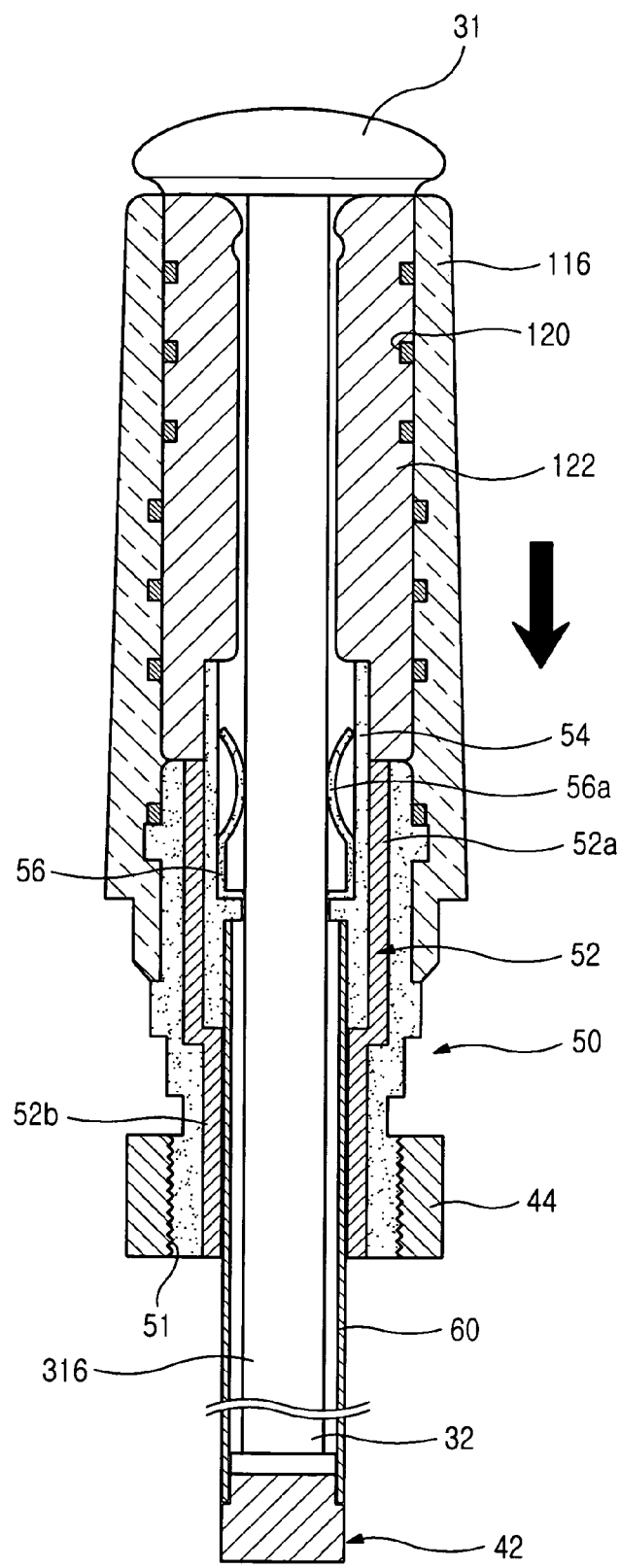
FIG. 12 is a longitudinal sectional view showing the construction of the antenna unit of FIG. 11 with the retractable rod antenna fully retracted.

As is shown in FIGS. 11 and 12, the antenna unit according to an embodiment of the present invention comprises the TV antenna, the communication antenna integrated with the TV antenna, and an insulator 52 that isolates the TV antenna and the communication antenna from each other to prevent electric coupling. The insulator 52 is a hollow member extending in the longitudinal direction thereof.

The helical antenna 120 is disposed in the antenna housing 116. In the antenna housing is coaxially disposed a bobbin 118, which comprises insulation material. The bobbin 118 completely isolates the rod antenna members 316, 314, 312, and 312 and the helical antenna 120 from each other. The antenna housing 116 extends in the longitudinal direction thereof, and the bobbin 118 also extends in the longitudinal direction of the antenna housing 116. The antenna housing 116 and the bobbin 118 are hollow members such that the retractable rod antenna 30 can be extended/retracted from/into the antenna housing 116 and the bobbin 118. The bobbin 118 is connected to the helical antenna 120 in the antenna housing 116. The rod antenna members of the retractable rod antenna 30 are extended and retracted through the bobbin 118. The lower end of the bobbin 118 contacts the upper end of the insulator 52 and the upper end of the metal contact connection member 50.

The TV antenna comprises retractable rod antenna members 316, 314, 312, and 310 that are retracted/extended in the longitudinal direction thereof; a stopper 32 formed at the end of the first antenna member 310 of the retractable rod antenna members for electrically contacting power feeding part 54 when the retractable rod antenna members are fully extended; a conductive tube 60 disposed to electrically contact the power feeding part 54 and the stopper 32; a connection terminal 41 disposed to electrically contact the conductive tube 60; and an antenna connecting and holding member 42 to hold the end of the conductive tube 60 and contact the connection terminal 41. The antenna connecting and holding member 42 has a cylindrical protrusion 42a inserted in the end of conductive tube 60. The cylindrical protrusion 42a comprises a metal material. The power feeding part 54 is provided with connection terminals 56, each of which has a C-shaped member 56a. The C-shaped members 56a are curved such that the convex surfaces thereof are opposite to each other, by which the connection between the stopper 32 and the power feeding part 54 is secured. The power feeding part 54 is disposed at the lower part of the helical antenna 120.

The communication antenna part comprises a helical antenna 120 disposed between the antenna housing 116 and the bobbin 118 in the longitudinal direction of the antenna housing 116 and the bobbin 118; a metal contact connection member 50 electrically connected to the helical antenna 120; and an antenna bushing 44 connected to the metal contact connection member 50. The antenna bushing 44 is also connected to the printed circuit board 12 by means of a terminal. The upper end of the metal contact connection member 50 is connected to the helical antenna 120. The metal contact connection member 50 is provided at the lower part thereof with a threaded part 51, by which the metal contact connection member 50 is engaged with the antenna bushing 44. Specifically, the helical antenna 120, the metal contact connection member 50, and the antenna bushing 44 are electrically connected to the printed circuit board 12 in sequence.

When the retractable rod antenna 30 is fully extended from the antenna housing 116, the stopper 32 and the conductive tube 60 come into contact with the power feeding part 54. The stopper 32 is disposed in the antenna housing 116 and the insulator 52 because the power feeding part 54 is disposed in the antenna housing 116, and the upper end of the conductive tube 60 is disposed in the antenna housing 116.

Preferably, the insulator 52 comprises: a first insulating part 52a; and a second insulating part 52b integrally formed at the first insulating part 52 and extending from the first insulating part 52a for receiving the conductive tube 60.

The construction of an antenna unit with integrated TV and communication antennas according to a second embodiment of the present invention will now be described in detail with reference to FIGS. 13 and 14. A communication antenna part, which comprises a helical antenna 120, a metal contact connection member 50, and an antenna bushing 44, according to the second embodiment of the present invention is identical to that of the first embodiment of the present invention. Accordingly, only the construction of a TV antenna part of the antenna unit will be described hereinafter.

Figure 13:
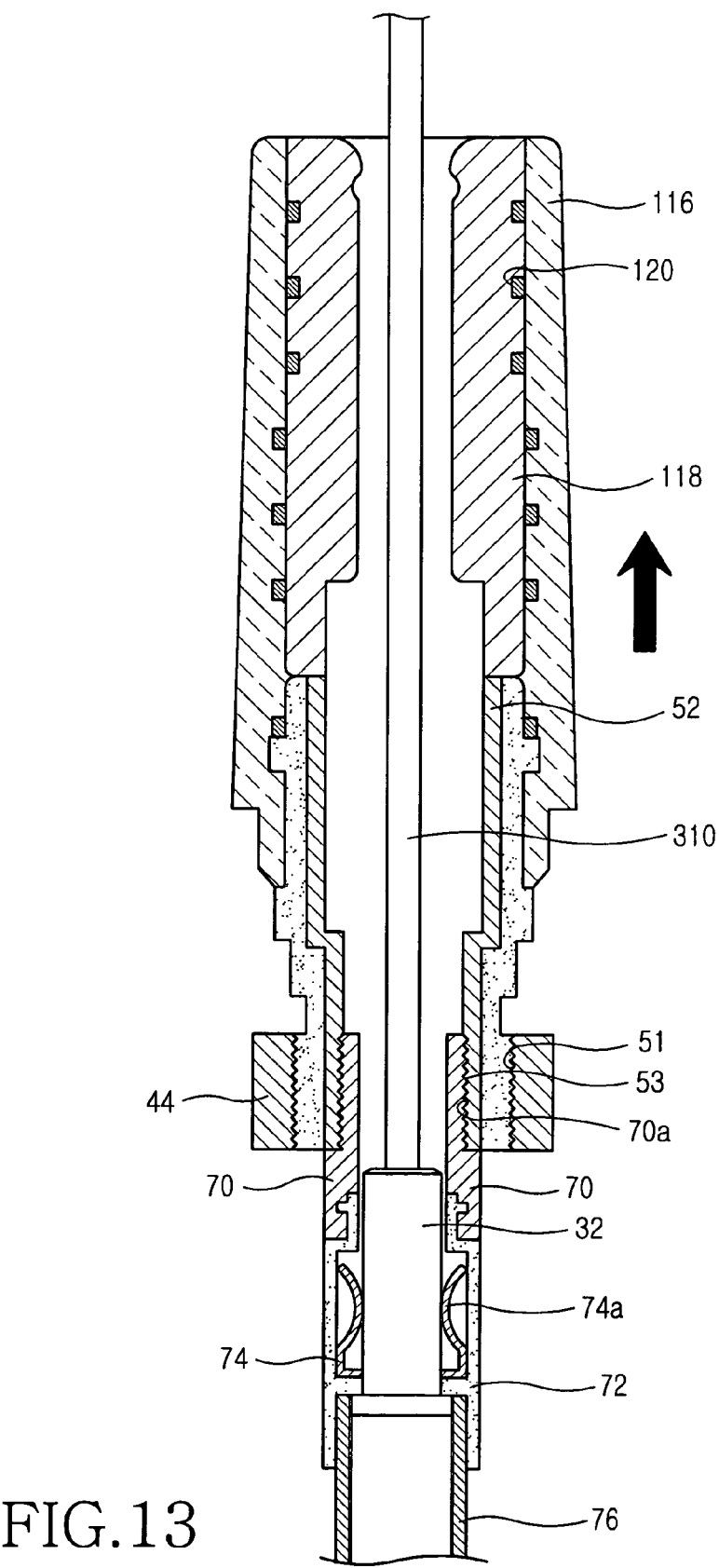
FIG. 13 is a longitudinal sectional view showing the construction of an antenna unit with a retractable rod antenna fully extended in accordance with a second embodiment of the present invention.
Figure 14:
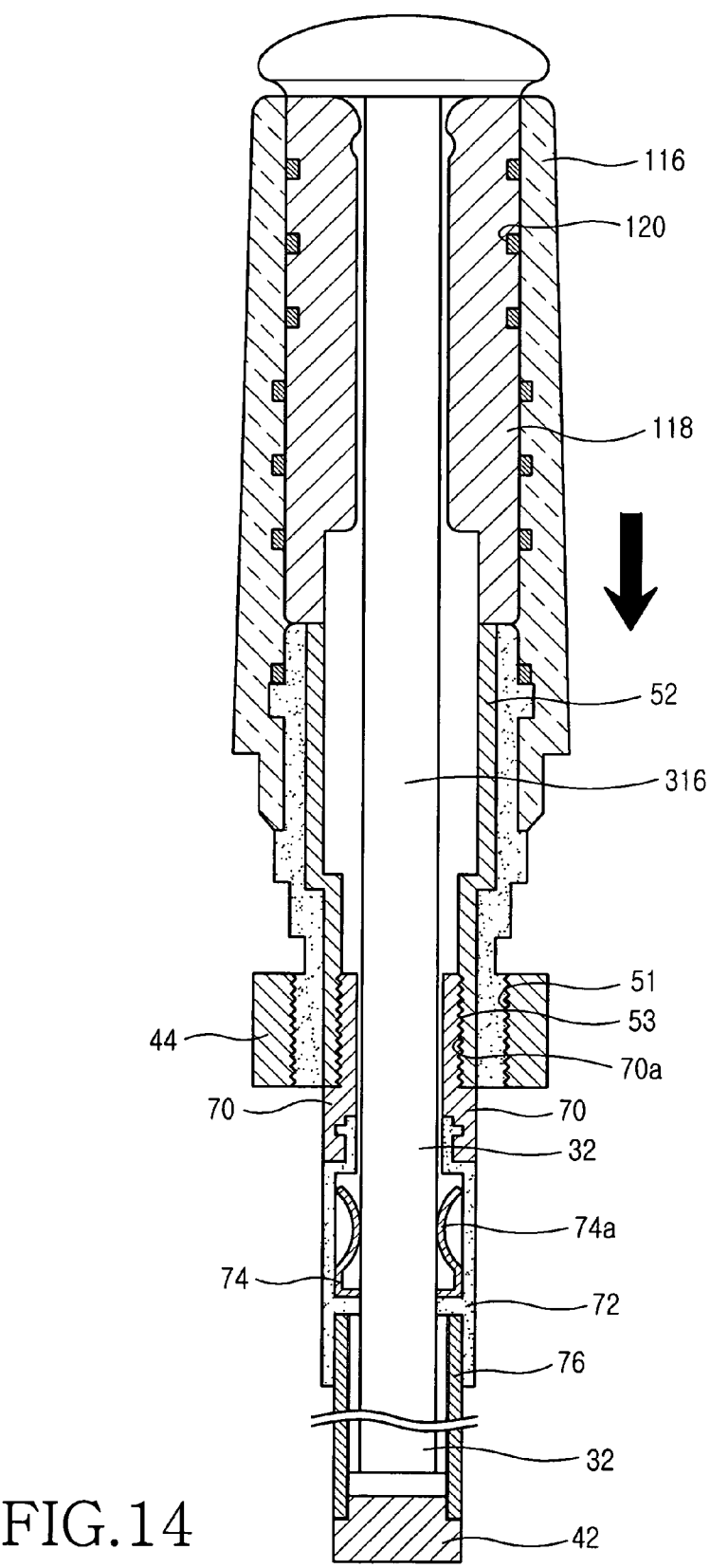
FIG. 14 is a longitudinal sectional view showing the construction of the antenna unit of FIG. 13 with the retractable rod antenna fully retracted.

FIG. 13 shows that a retractable rod antenna 30 of the antenna unit is fully extended from the antenna housing 116 of the terminal housing, and FIG. 14 shows that the retractable rod antenna 30 of the antenna unit is fully retracted into the antenna housing 116 of the terminal housing.

As shown in FIGS. 13 and 14, contact connection members 70 and 72, which comprise the TV antenna of the antenna unit according to the second embodiment of the present invention, are disposed below the antenna housing 116, specifically below the metal contact connection member 50. When the stopper 32 of the retractable rod antenna is fully extended, the contact connection members 70 and 72 contact the conductive tube 60. The contact connection members 70 and 72 are separated parts, which are connected to the metal contact connection member 50 for the communication antenna. The contact connection members 70 and 72 are coaxially disposed below the metal contact connection members 50.

Specifically, the TV antenna comprises retractable rod antenna members 316, 314, 312, and 310 that are retracted/extended in the longitudinal direction thereof; contact connection members coaxially disposed below the metal contact connection members 50; a stopper 32 formed at the end of the first antenna member 310 of the 20 retractable rod antenna members for electrically contacting the contact connection members 70 and 72 when the retractable rod antenna members are fully extended; a conductive tube 76 disposed to electrically contact the contact connection members 70 and 72 and the stopper 32; and an antenna connecting and holding member 42 to hold the conductive tube 76. The antenna connecting and holding member 42 is electrically connected to the printed circuit board by means of a connection terminal.

The contact connection members 70 and 72 comprise an insulating connection part 70 and a metal contact part 72 integrally attached to the insulating connection part 70 in the longitudinal direction of the insulating connection part 70. The insulating connection part 70 is provided at the upper part thereof with a threaded part 70a for allowing the insulating connection part 70 to be engaged with the insulator 52. The conductive tube 76 is inserted in the lower end of the metal contact part 72. The metal contact part 72 is provided with connection terminals 74, each of which has a C-shaped member 74a. The C-shaped members 56a are provided for improving connectability.

The insulator 52 is provided at the inner lower part thereof with a threaded part 52a. The insulating connection part 70 comprises a plastic material, and the metal contact part 72 comprises a copper material.

When the retractable rod antenna 30 is fully extended from the antenna housing 116, the stopper 32 contacts the upper end of the conductive tube 76 in the metal contact part 72. The contact point is located below the antenna housing, specifically below the metal contact connection member 50. The contact point is spaced apart from the power feeding part (the position where the helical antenna contacts the metal contact connection member) of the communication antenna to prevent electric coupling.

Figure 15A:
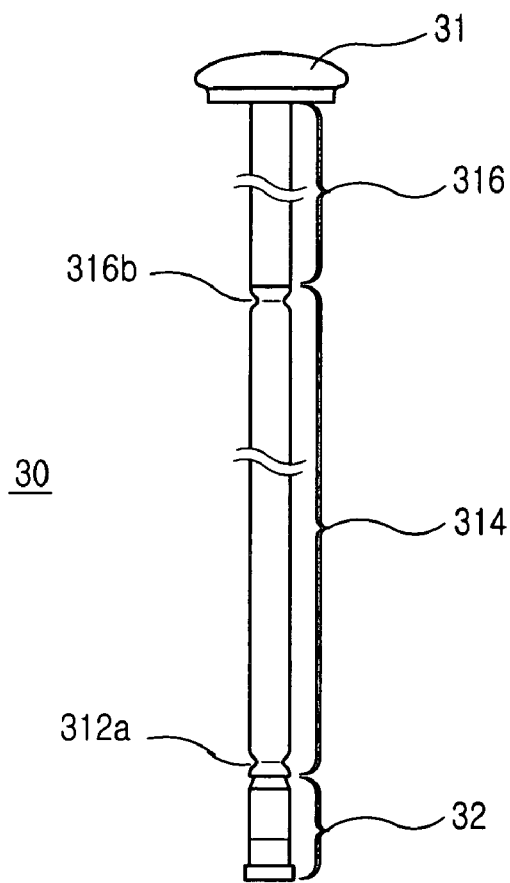
FIGS. 15A to 15C are views of the retractable rod antenna adopted in the antenna unit of the present invention showing extension of the retractable rod antenna.
Figure 15B:
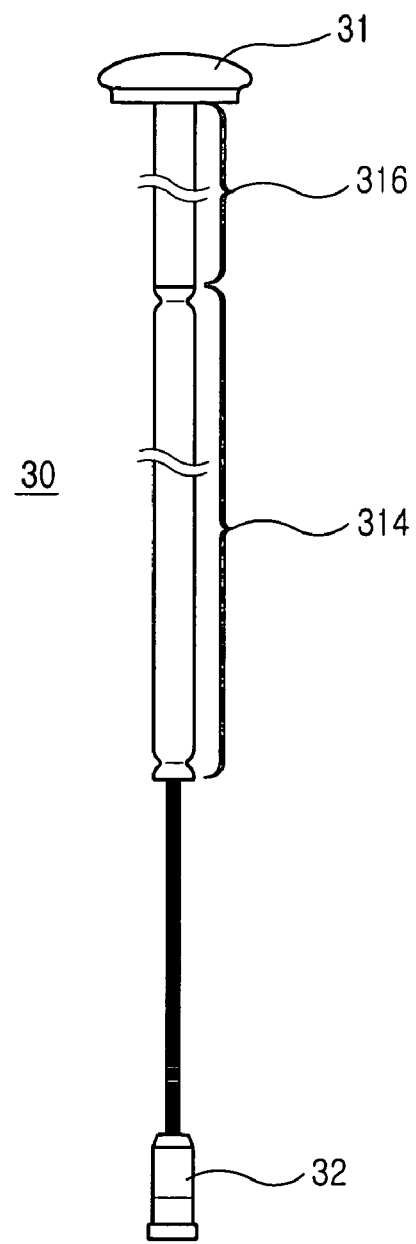
Figure 15C:
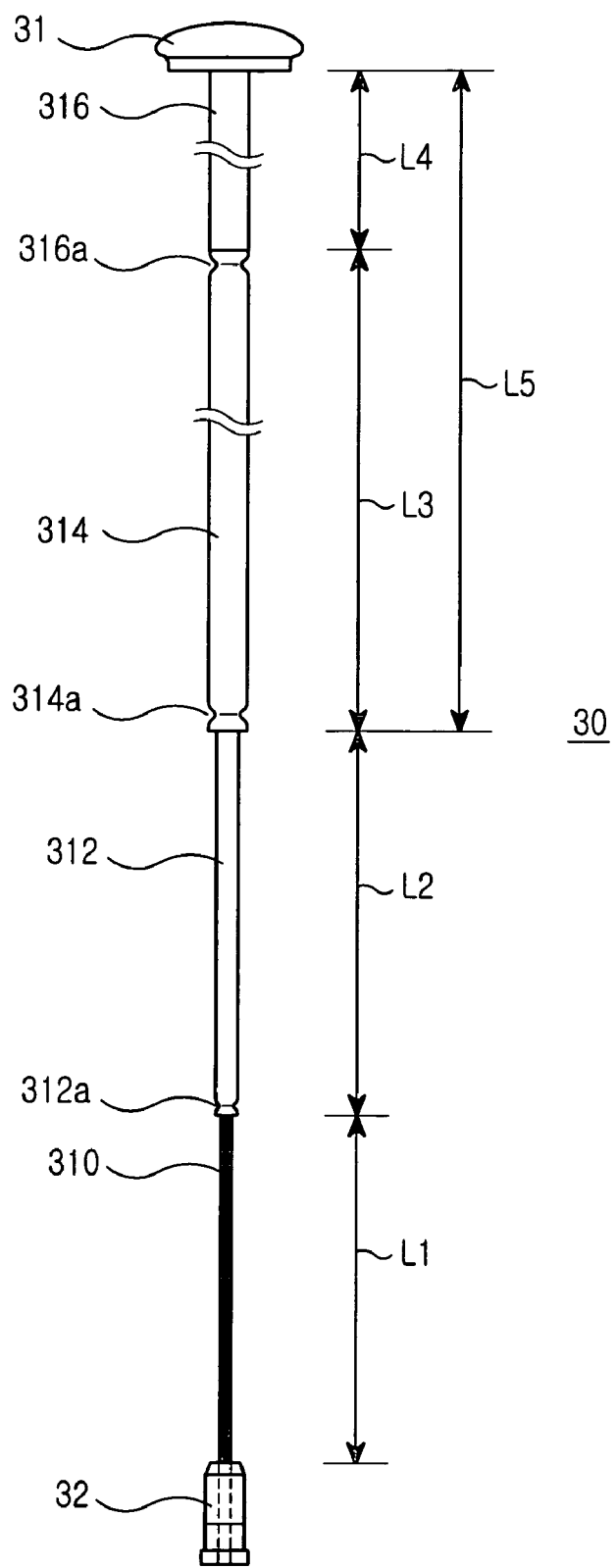

The construction of the retractable rod antenna of the TV antenna part according to the second embodiment of the present invention will now be described in detail with reference to FIGS. 15A to 15C.

The retractable rod antenna 30 comprises a first rod antenna member 314 and 316; a second rod antenna member 312; a third rod antenna member 310; and a conductive metal stopper 32 attached to the upper end of the third rod antenna member 310. The third rod antenna member 310 is extended/retracted from/into the second rod antenna member 312 in the longitudinal direction thereof, and the second rod antenna member 312 is extended/retracted from/into a conductive part 314 of the first rod antenna member in the longitudinal direction thereof. The first, second and third rod antenna members 316, 314, 312, and 310 are slid relative to each other. Preferably, the length L3 of the conductive part 314 of the first rod antenna member is greater than the length L2 of the second rod antenna member 312, which is greater than the length L1 of the third rod antenna member 310.

Preferably, the first, second and third rod antenna members 316, 314, 312, and 310 are made of solid materials. Specifically, the first and second rod antenna members 316, 314, and 312 are made of solid materials, and the third rod antenna member 310 is flexible from side to side although it is also made of a solid material, especially a conductive wire containing nickel-titanium. The first rod antenna member comprises an insulating part 316 and a conductive part 314. The insulating part 316 extends a predetermined length L4, and the conductive part 314 extends a predetermined length L3. The length L5 of the first rod antenna member is the sum of the length L4 of the insulating part 316 and the length L3 of the conductive part 314. The length L4 of the insulating part 316 is greater than that of the antenna housing 116 when the retractable rod antenna is fully retracted into the antenna housing 116.

When the retractable rod antenna 30 is fully extended from the antenna housing 116, it is flexible from side to side within predetermined degrees, since the third rod antenna member 310 has elasticity. Preferably, the third rod antenna member 310 is made of a piano cable. Specifically, the third rod antenna member 310 does not have elasticity in the longitudinal direction thereof, but has elasticity in the direction perpendicular to the longitudinal direction.

The diameter of the first rod antenna member 314 and 316 is greater than that of the second rod antenna member 312, which is greater than that of the third rod antenna member 310. The conductive part 314 of the first rod antenna member and the second rod antenna member 312 are provided with neck-shaped separation-preventing parts 314a and 312a, by which the rod antenna members are not separated from each other. The end of the third rod antenna member 310 is integrally formed at the end of the stopper 32.

The length L5 of the retractable rod antenna 30 is less than that of the terminal housing 10 when the retractable rod antenna 30 is fully retracted. When the retractable rod antenna 30 is fully extended from the antenna housing 116, however, the total length L1+L2+L5 of the retractable rod antenna 30 is greater than that of the terminal housing 10. As a result, the performance of the antenna is maximized, and thus the retractable rod antenna is suitable for a TV image signal-receiving antenna.

As described above, the retractable rod antenna 30 according to an embodiment of the present invention comprises three rod antenna members, which are retracted/extended in the longitudinal direction thereof, although less than or more than three rod antenna members may be used. Also, the first and second rod antenna members of the retractable rod antenna 30 may have elasticity in the direction perpendicular to the longitudinal direction thereof. Specifically, the conductive part 314 of the first rod antenna member and the second rod antenna member 312 may be made of flexible materials.

Figure 17:
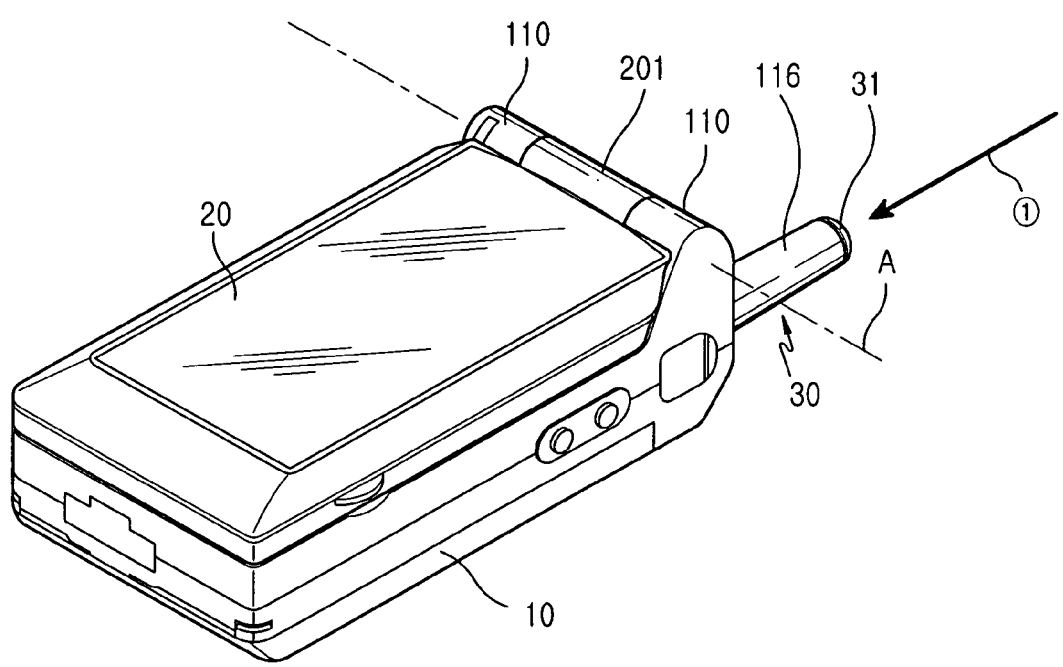
FIG. 17 is a perspective view of a portable communication terminal having an antenna unit with a retractable rod antenna fully retracted in accordance with a third embodiment of the present invention.
Figure 18:
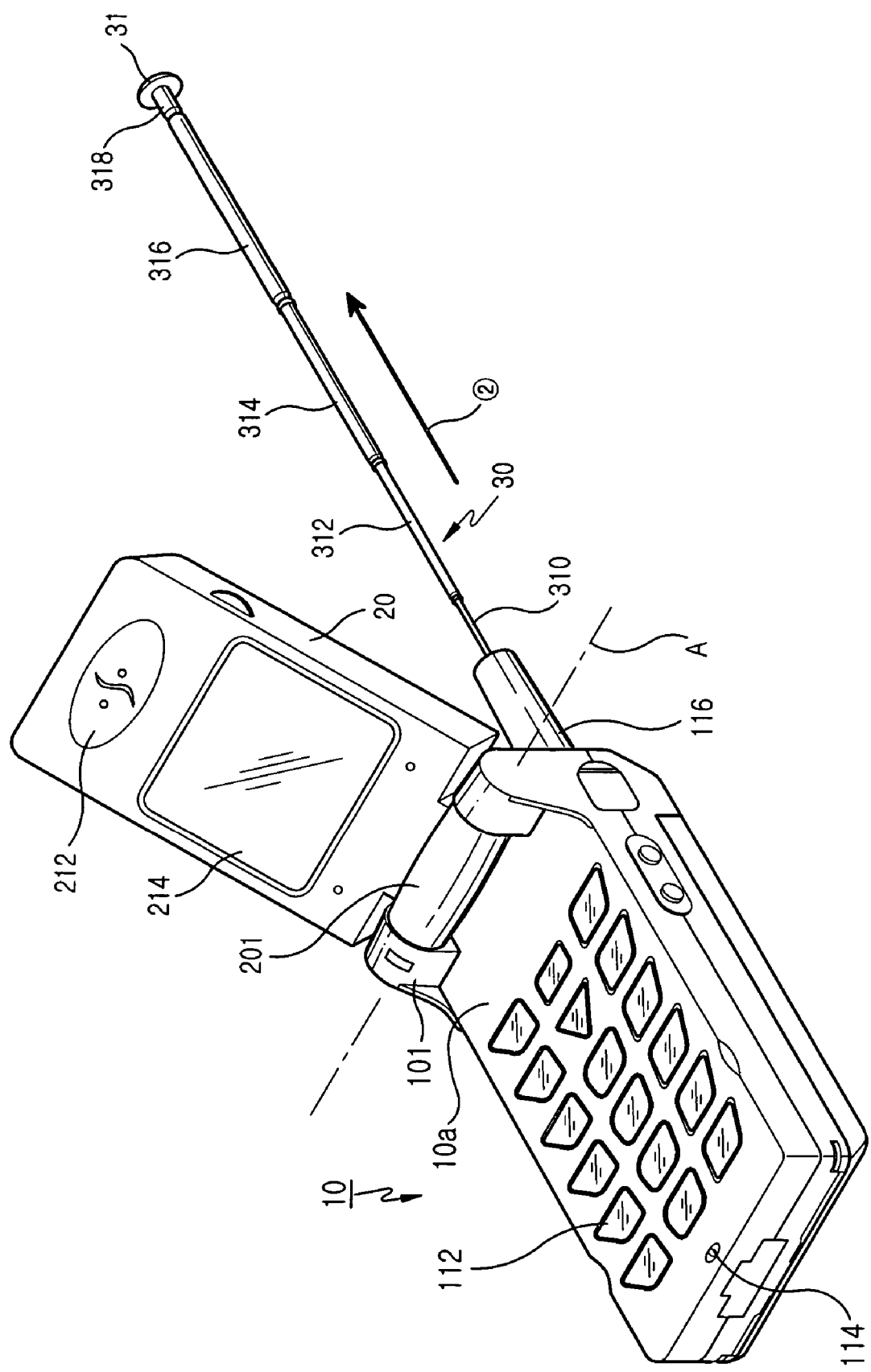
FIG. 18 is a perspective view of the portable communication terminal in which the antenna unit comprising the retractable rod antenna is fully extended in accordance with the third embodiment of the present invention.

FIGS. 17 and 18 show a portable communication terminal with an antenna unit according to a third embodiment of the present invention. The portable communication terminal is a folder-type communication terminal. The description of the present invention will be given hereinafter assuming that the antenna unit according to the third embodiment of the present invention is adopted in the folder-type communication terminal, although the present invention is applicable to any type of portable communication terminal.

FIG. 17 shows the portable communication terminal when a folder part 20 of the portable communication terminal is in contact with a terminal housing 10 of the portable communication terminal, i.e., the folder part 20 is closed. FIG. 18 shows the portable communication terminal when the folder part 20 is rotated about a hinge axis A from the terminal housing 10, i.e., the folder part 20 is opened. A retractable rod antenna 30 of the antenna unit is fully extended in FIG. 18.

The portable communication terminal comprises a terminal housing 10, a folder part 20, and a hinge unit to connect the folder part 20 to the terminal housing 10 such that the folder part 20 can be rotated about a hinge axis A from the terminal housing 10. A hinge module of the hinge unit is mounted in a center hinge housing 201, and is therefore not shown in the drawings.

To the terminal housing 10 is mounted an antenna unit with integrated TV and communication antennas. The terminal housing 10 is provided at the upper surface 10a thereof with two opposite side hinge arms 110, a key array 112 comprising a plurality of keys, and a microphone 114. The folder part 20 is provided at the lower surface thereof with a speaker 212 and a display unit 214.

The retractable rod antenna 30 of the antenna unit is retracted/extended into/out of an antenna housing 116 of the terminal housing 10. Preferably, the retractable rod antenna 30 is retracted/extended through multiple steps. The antenna unit according to the present invention, specifically the retractable rod antenna 30 of the TV antenna part, is fully retracted and extended in FIGS. 17 and 18, respectively.

First, second and third rod antenna members 316, 314, 312 and 310 of the retractable rod antenna 30 are shown in FIG. 18. The direction of the arrow ① in FIG. 17 indicates the direction in which the retractable rod antenna 30 is retracted, and the direction of the arrow ② in FIG. 18 indicates the direction in which the retractable rod antenna 30 is extended.

Figure 19:
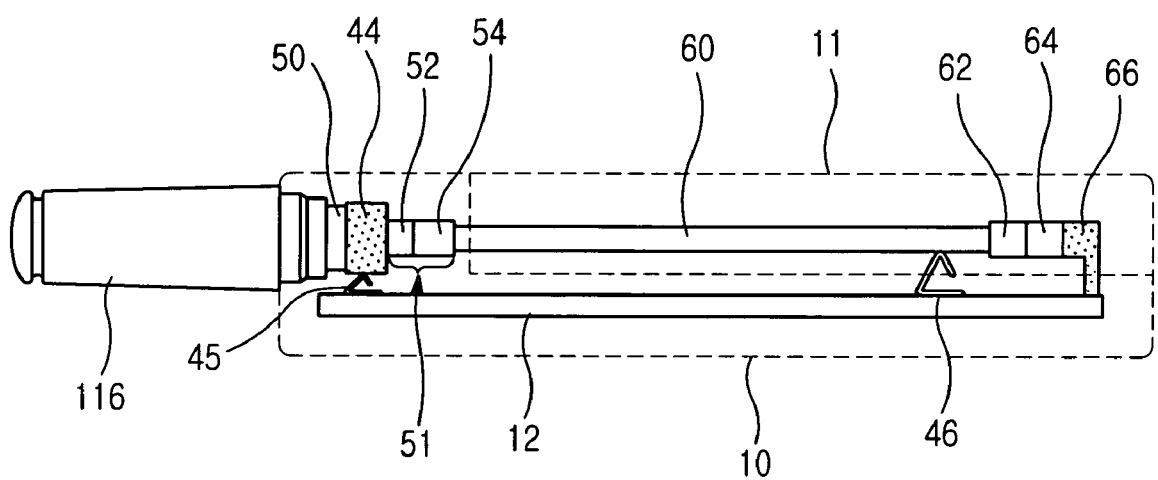
FIG. 19 is a side view showing the antenna unit mounted in the portable communication terminal in accordance with the third embodiment of the present invention.
Figure 20:
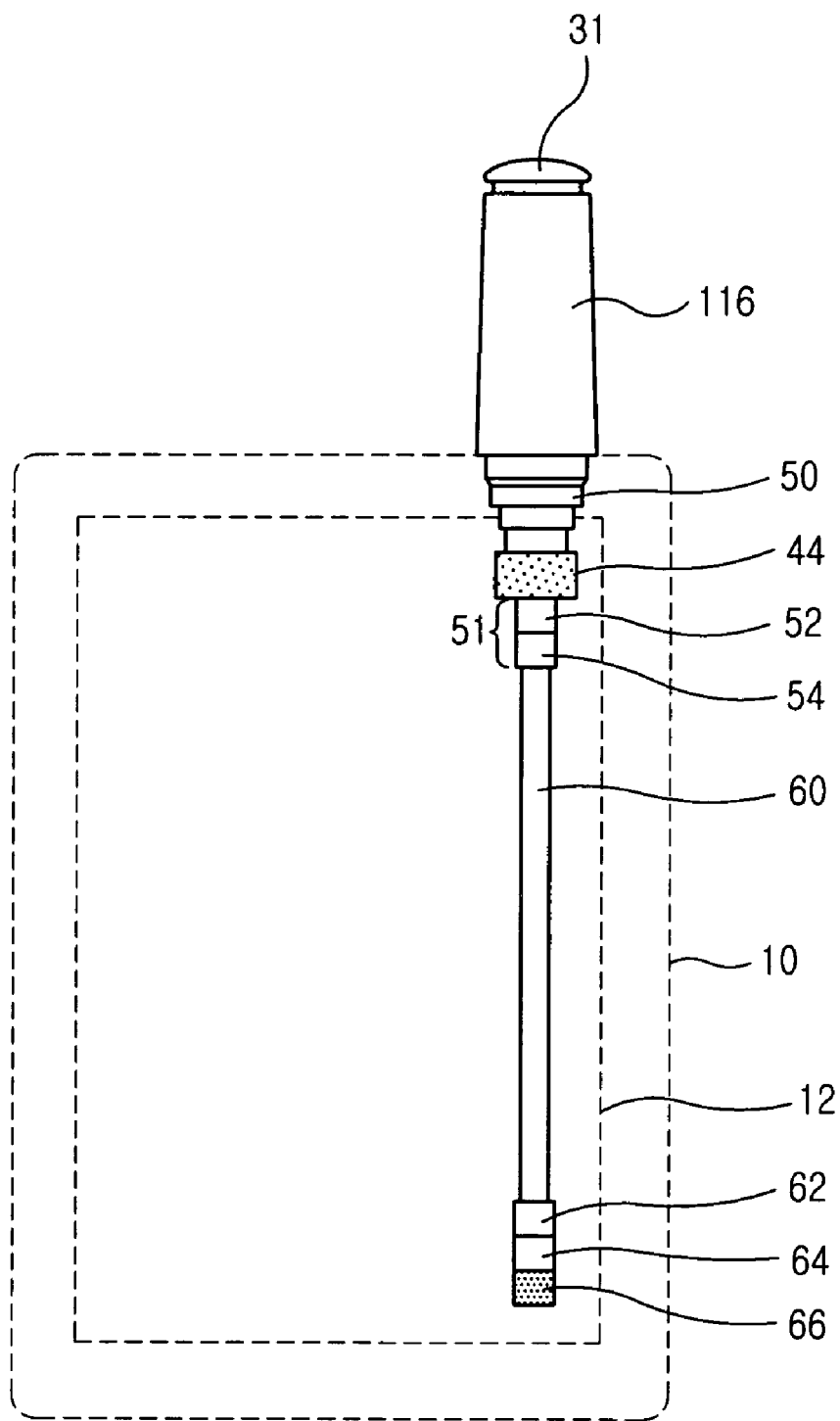
FIG. 20 is a front view showing the antenna unit mounted in the portable communication terminal in accordance with the third embodiment of the present invention.
Figure 21:
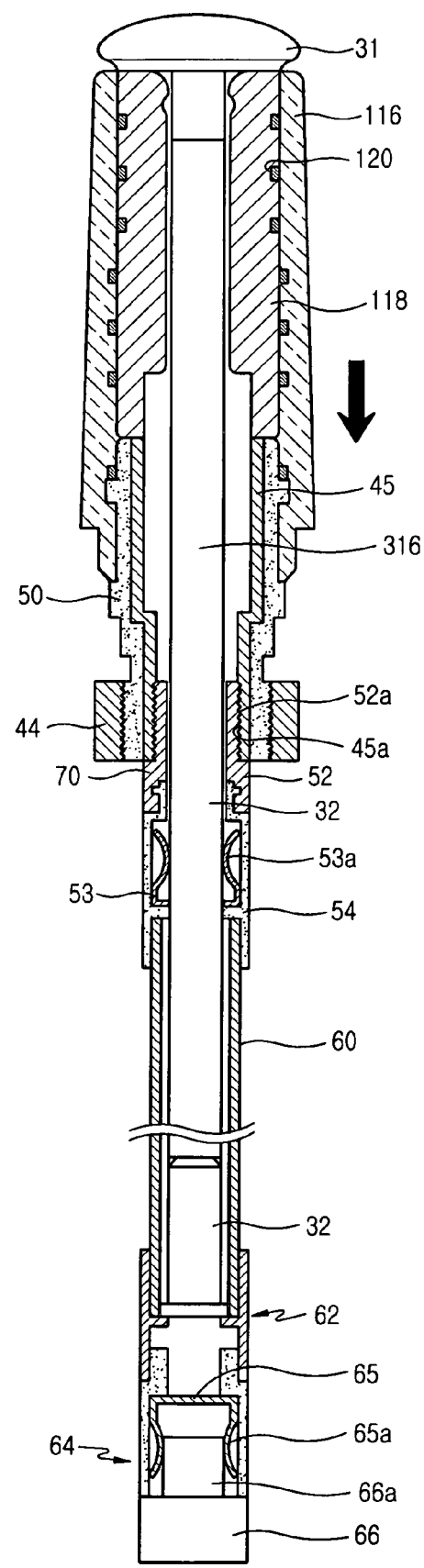
FIG. 21 is a longitudinal sectional view illustrating the retractable rod antenna fully retracted in accordance with the third embodiment of the present invention.
Figure 22:
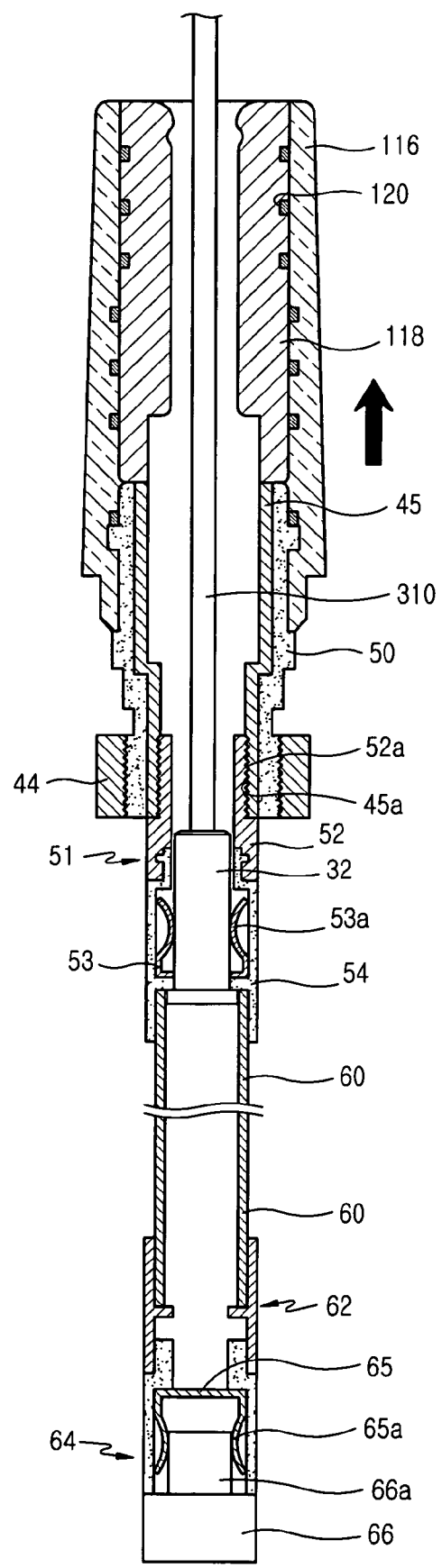
FIG. 22 is a longitudinal sectional view illustrating the retractable rod antenna fully extended in accordance with the third embodiment of the present invention.

As shown in FIGS. 19 and 20, the antenna unit according to the third preferred embodiment of the present invention comprises: a TV antenna part comprising a retractable rod antenna 30 and a conductive tube 60; a communication antenna part coaxially surrounding the TV antenna part for transmitting/receiving communication signals; a first insulator 45 to isolate the TV antenna part and the communication antenna part from each other; and a first contact connection member 51 to contact the stopper 32 of the retractable rod antenna 30 and the end of the conductive tube 60 below the communication antenna part.

The first contact connection member 51 is provided at the upper outer circumference thereof with a thread part 52a, and the first insulator 45 is provided at the lower inner surface thereof with a thread part 45a, such that the first contact connection member 51 and the first insulator 45 are engaged with each other.

The conductive tube 60 is made of a copper pipe. One end of the conductive tube 60 is inserted in the first contact connection member 51 located below the communication antenna part. The other end of the conductive tube 60 is fixed at the position adjacent to the lower end of the terminal housing 10. The conductive tube 60 is electrically connected to the printed circuit board 12 by means of the connection terminal 46 for transmitting received TV signals to the printed circuit board 12.

The conductive tube 60 is integrally attached to the first contact connection member 51 in the longitudinal direction of the communication antenna part.

The first insulator 45 extends along the metal contact connection member 50 of the communication antenna part. The first insulator 45 is a hollow member, through which the retractable rod antenna 30 is retracted/extended.

Specifically, the TV antenna part comprises: a retractable rod antenna 30 comprising a plurality of rod antenna members, which are retracted/extended in the longitudinal direction of the antenna housing 116 for receiving TV signals; and a conductive tube 60 connected to the stopper of the retractable rod antenna 30 for transmitting the received TV signals to a TV tuner (not shown).

The first contact connection member 51 comprises: an insulating connection part 52 connected to the lower end of the first insulator 45; and a metal contact part 54 coaxially attached to the lower end of the insulating connection part 52. The metal contact part 54 contacts the upper end of the conductive tube 60 and the stopper 32 of the retractable rod antenna.

The metal contact part 54 is provided with first connection terminals 53, each of which has a C-shaped member 53a. The C-shaped members 53a are provided for improving connectability with the stopper 32.

To the lower end of the conductive tube 60 is preferably attached a second insulating part 62. The second insulating part 62 is forcibly fitted on the lower end of the conductive tube 60. To the lower end of the second insulating part 62 is also attached a metal ground part 64. The metal ground part 64 is provided with second connection terminals 65, each of which has a C-shaped member 65a. The C-shaped members 65a are provided for improving connectability with a holding part 66, which will be described below.

The holding part 66 is attached to the lower end of the metal ground part 64. The holding part 66 is provided with a cylindrical protrusion 66a, which is inserted into the lower end of the metal ground part 64. The holding part is made of a metal material, and connected to the printed circuit board 12. Consequently, the metal ground part 64 and the holding part 66 together serve as a grounding device.

The communication antenna part comprises a helical antenna 120 disposed in the antenna housing 116 in the longitudinal direction thereof; a second contact connection member 50 connected to the lower end of the helical antenna 120; and an antenna bushing 44 connected to the second contact connection member 50 for transmitting communication signals to an RF unit of the printed circuit board 12 of the terminal housing. The antenna bushing 44 is electrically connected to the printed circuit board 12 by means of the connection terminal 45 for transmitting received communication signals to the printed circuit board 12.

The antenna unit according to the third embodiment of the present invention has an insulating bobbin 118 disposed opposite to the inner circumference of the antenna housing 116 for isolating the retractable rod antenna and the communication antenna from each other. The bobbin 118 is a hollow member, which extends along the antenna housing 116. Consequently, the retractable rod antenna is retracted/extended through the bobbin 118.

Figure 23:
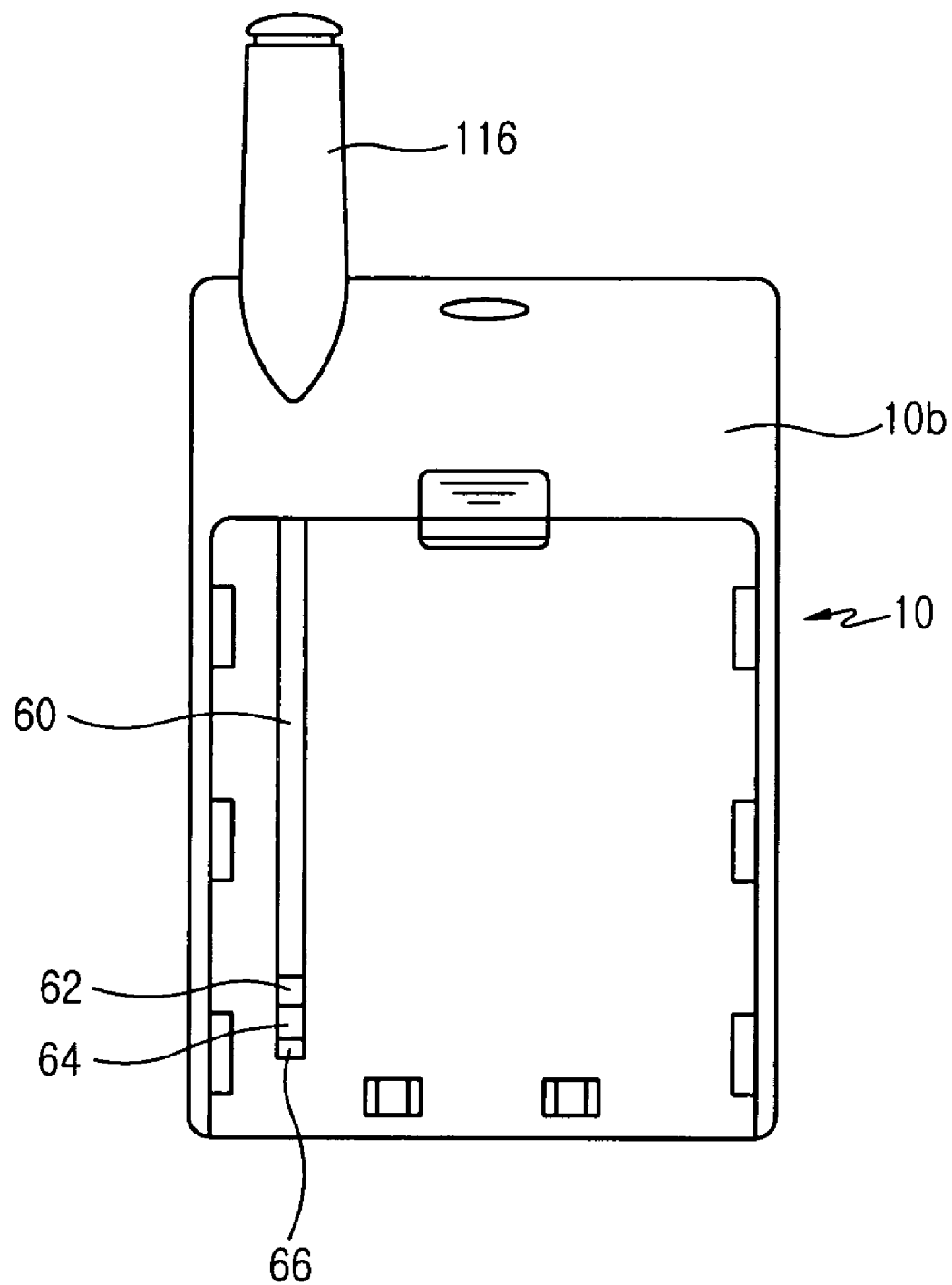
FIG. 23 is a rear view of the terminal housing of the portable communication terminal in which the battery pack is removed.
Figure 24A:
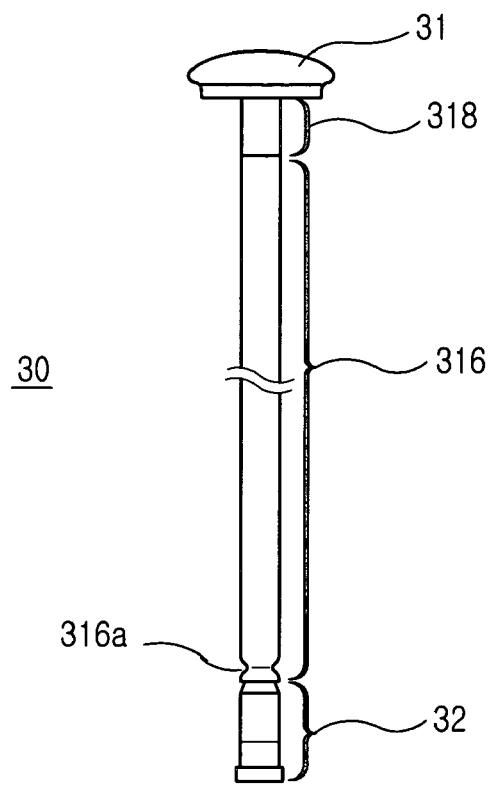
FIGS. 24A through 24D are views illustrating extension of the retractable rod antenna.
Figure 24B:
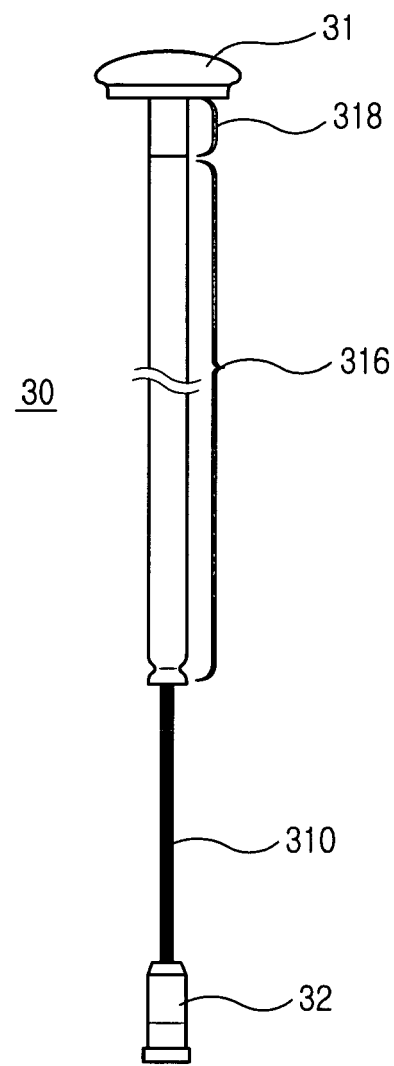
Figure 24C:
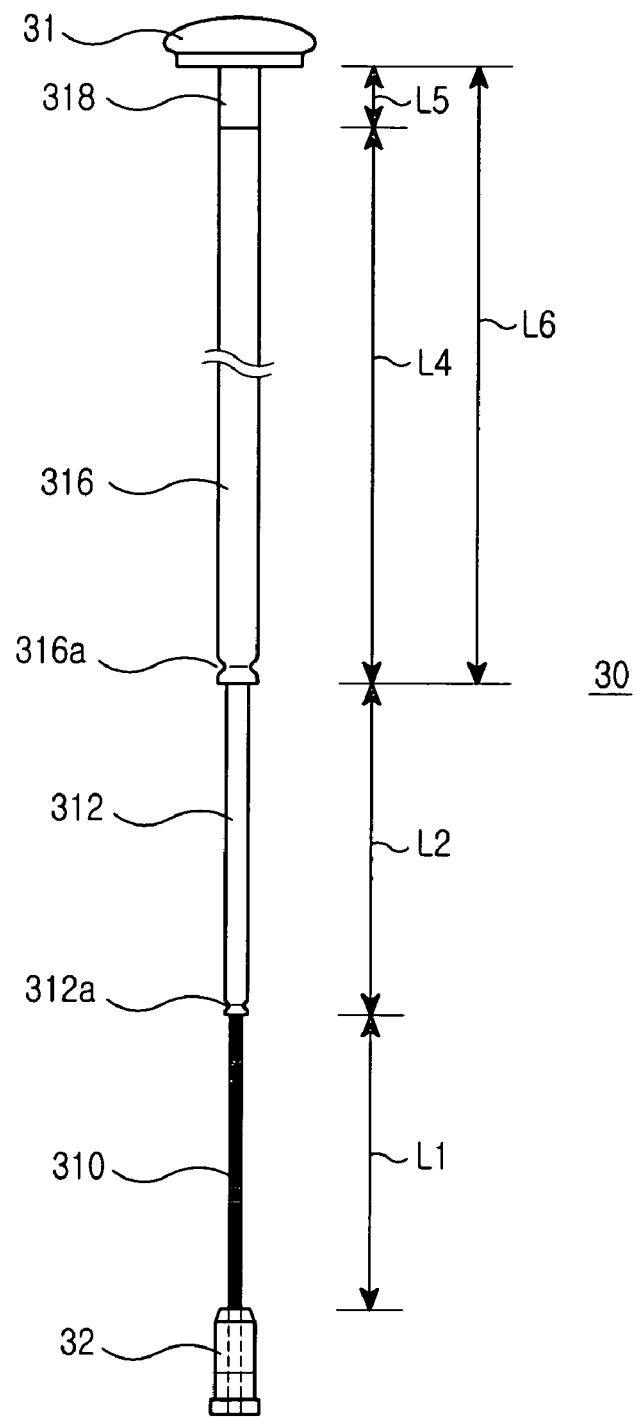
Figure 24D:
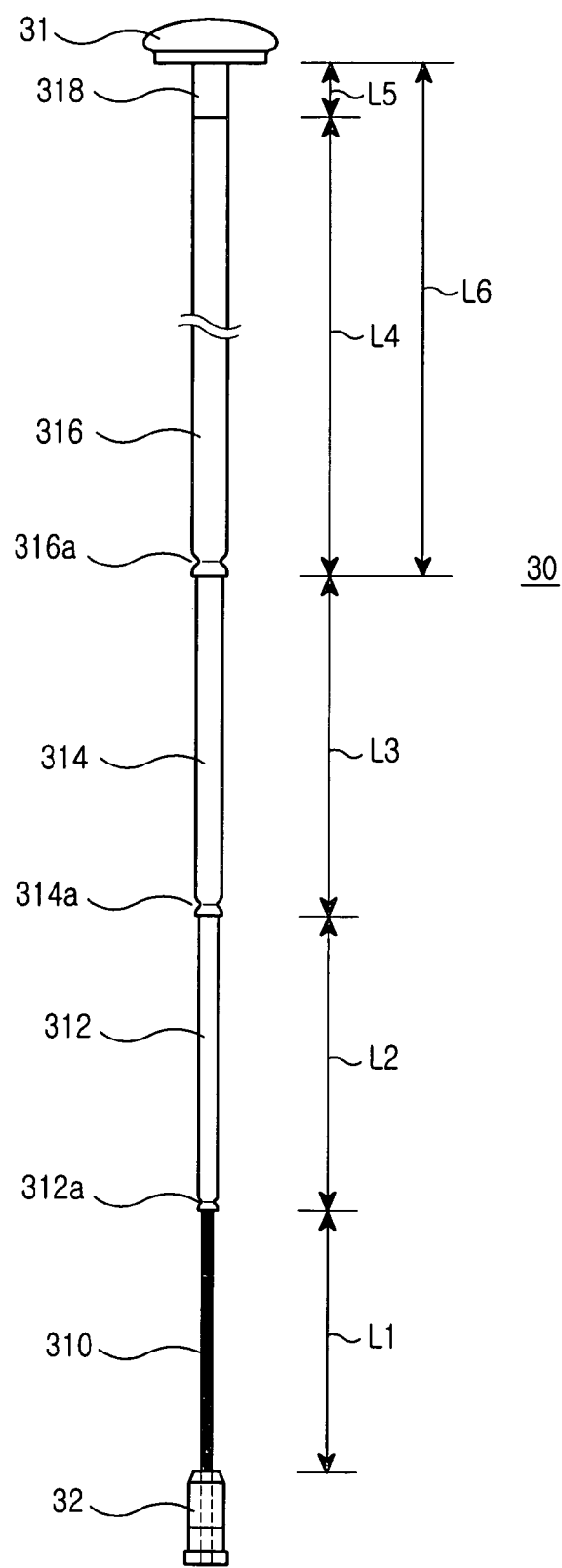

When a battery pack 11 is removed from the rear surface 10b of the terminal housing 10 after the antenna unit according to the third embodiment of the present invention is mounted to the terminal housing 10 as shown in FIG. 23, the conductive tube 60, the second insulating part 62, the metal ground part 64, and the holding part 66 are exposed. The holding part 66, which is made of metal, serves as the grounding device.

The construction of the retractable rod antenna 30 of the TV antenna part according to the third embodiment of the present invention will now be described in detail with reference to FIGS. 24A to 24D.

The retractable rod antenna 30 comprises a first rod antenna member 316 and 318; a second rod antenna member 314; a third rod antenna member 312; a fourth rod antenna member 310; and a conductive metal stopper 32 attached to the upper end of the fourth rod antenna member 310. The fourth rod antenna member 310 is extended/retracted from/into the third rod antenna member 312 in the longitudinal direction thereof, and the third rod antenna member 312 is extended/retracted from/into the second rod antenna member 314, and the second rod antenna member 314 is extended/retracted from/into a conductive part 316 of the first rod antenna member in the longitudinal direction thereof.

The first, second, third, and fourth rod antenna members 318, 316, 314, 312, and 310 are slid relative to each other. Preferably, the length L4 of the conductive part 316 of the first rod antenna member is greater than the length L3 of the second rod antenna member 314, which is greater than the length L2 of the third rod antenna member 312, which is greater than the length L1 of the fourth rod antenna member 310.

Preferably, the first, second, third, and fourth rod antenna members 318, 316, 314, 312, and 310 are made of solid materials. Specifically, the fourth rod antenna member 310 is flexible from side to side although it is made of a solid material, especially a conductive wire containing nickel-titanium.

The first rod antenna member comprises an insulating part 318 and a conductive part 316. The insulating part 318 has a predetermined length L5, and the conductive part 316 has a predetermined length L4. The length L6 of the first rod antenna member is the sum of the length L5 of the insulating part 318 and the length L4 of the conductive part 316. The length L5 of the insulating part 318 is less than half of the length of the helical antenna when the retractable rod antenna is fully retracted into the antenna housing 116.

When the retractable rod antenna 30 according to an embodiment of the present invention is fully extended from the antenna housing 116, it is flexible from side to side within predetermined degrees, since the fourth rod antenna member 310 has elasticity. Preferably, the fourth rod antenna member 310 is made of a piano cable. Specifically, the fourth rod antenna member 310 does not have elasticity in the longitudinal direction thereof, but has elasticity in the direction perpendicular to the longitudinal direction.

The diameter of the first rod antenna member 316 and 318 is greater than that of the second rod antenna member 314, which is greater than that of the third rod antenna member 312, which is greater than that of the fourth rod antenna member 310.

The conductive part 316 of the first rod antenna member and the second and third rod antenna members 314 and 312 are provided with neck-shaped separation-preventing parts 316a, 314a, and 312a, by which the rod antenna members are not separated from each other. The end of the fourth rod antenna member 310 is integrally formed at the end of the stopper 32. The lower end of the third rod antenna member 312 is inserted into the stopper 32.

The length L6 of the retractable rod antenna 30 is less than that of the terminal housing 10 when the retractable rod antenna 30 is fully retracted. When the retractable rod antenna 30 is fully extended from the antenna housing 116, however, the total length L1+L2+L3+L6 of the retractable rod antenna 30 is greater than that of the terminal housing 10.

The retractable rod antenna 30 according to the present invention comprises four rod antenna members, which are retracted/extended in the longitudinal direction thereof, although less than or more than four rod antenna members may be used.

As apparent from the above description, the present invention provides an antenna unit with integrated TV and communication antennas for portable communication terminals. Consequently, the present invention has the effect of miniaturizing the portable communication terminals, reducing the manufacturing costs of the portable communication terminals, improving portability of the portable communication terminals, and minimizing possibility of dropping the portable communication terminals.

Although the certain embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An antenna unit for portable communication terminals having a TV function, the antenna unit comprising:
    a TV antenna having a rod antenna for receiving a TV signal, and a guide antenna for receiving the TV signal from the rod antenna and transmitting the received TV signal to a TV tuner; and
    a communication antenna having a helical antenna for receiving a communication signal, and a connector for receiving the communication signal from the helical antenna and transmit the received communication signal to a radio frequency (RF) unit.

2. The unit as set forth in claim 1, further comprising:
    an insulation disposed between the guide antenna and the connector for insulating the TV antenna and the communication antenna from each other.

3. A method for separately receiving a TV signal and a communication signal from an antenna of a portable communication terminal, the method comprising the steps of:
    receiving the TV signal through a rod antenna;
    transmitting the received TV signal to a TV tuner through a guide antenna;
    receiving the communication signal through a helical antenna when the communication signal; and
    transmitting the received communication signal to a radio frequency (RF) unit through a connector.

4. The method as set forth in claim 3, wherein:
    the TV signal is received through the rod antenna, and the received TV signal is transmitted to the TV tuner through the guide antenna when the TV signal is received if the rod antenna is extended; and
    the TV signal is received and transmitted to the TV tuner through the guide antenna if the TV signal is received while the rod antenna is retracted.

5. An antenna unit for portable communication terminals each comprising a terminal housing and an antenna housing mounted to the terminal housing, wherein the antenna unit comprises:
    a TV antenna having a retractable rod antenna disposed in the terminal housing such that the retractable rod antenna can be retracted/extended into/from the terminal housing, a conductive tube connected to the retractable rod antenna, the conductive tube being disposed in the longitudinal direction of the terminal housing, and an antenna connecting and holding member attached to the end of the conductive tube;
    a communication antenna integrally attached to the TV antenna while being disposed coaxially to the TV antenna part; and
    an insulator formed in the longitudinal direction of the communication antenna for isolating the TV antenna and the communication antenna from each other.

6. The unit as set forth in claim 5, wherein a stopper of the retractable rod antenna contacts the upper end of the conductive tube in the antenna housing and in the insulator when the retractable rod antenna is fully extended.

7. The unit as set forth in claim 5, wherein the communication antenna comprises:
    a helical antenna disposed in the longitudinal direction of the antenna housing;
    a metal contact connection member connected to the lower end of the helical antenna; and
    an antenna bushing connected to the metal contact connection member for connecting the helical antenna to a printed circuit board by means of a connection terminal.

8. The unit as set forth in claim 5, wherein the conductive tube comprises a copper pipe, and the conductive tube has one end disposed in the antenna housing and the other end disposed adjacent to the lower end of the terminal housing.

9. The unit as set forth in claim 5, wherein the conductive tube has one end contacting a power feeding part disposed in the insulator and the other end inserted in the antenna connecting and holding member.

10. The unit as set forth in claim 9, wherein the antenna connecting and holding member has a cylindrical protrusion inserted in the end of the conductive tube.

11. The unit as set forth in claim 5, wherein the conductive tube has a length less than that of the terminal housing.

12. The unit as set forth in claim 5, wherein the insulator is disposed between the metal contact connection member and the conductive tube.

13. The unit as set forth in claim 5, wherein the insulator comprises:
   a first insulating part to receive a stopper; and
   a second insulator integrally formed at the first insulator and extending from the first insulator for receiving the conductive tube.

14. The unit as set forth in claim 5, further comprising:
   a bobbin disposed opposite to the inner circumference of the antenna housing for isolating the communication antenna and the TV antenna from each other, the bobbin being a hollow member, through which the retractable rod antenna is retracted/extended.

15. The unit as set forth in claim 5, wherein the retractable rod antenna comprises:
   a first rod antenna member;
   a second rod antenna member extendable/retractable from/into the first rod antenna member;
   a third rod antenna member extendable/retractable from/into the second rod antenna member in the longitudinal direction thereof, the third rod antenna having elasticity in the direction perpendicular to the longitudinal direction; and
   a stopper attached to one end of the third rod antenna member.

16. The unit as set forth in claim 15, wherein the first rod antenna member comprises:
   an insulating part having a first length; and
   a conductive part having a second length, the conductive part extending from the insulating part in the longitudinal direction thereof.

17. The unit as set forth in claim 5, wherein the TV antenna further comprises:
   connection terminals disposed in the insulator, each of the connection terminals having a C-shaped member.

18. An antenna unit for portable communication terminals each comprising a terminal housing and an antenna housing mounted to the terminal housing, wherein the antenna unit comprises:
   a TV antenna part including a retractable rod antenna disposed in the terminal housing such that the retractable rod antenna can be retracted/extended into/from the terminal housing, a conductive tube connected to the retractable rod antenna, the conductive tube being disposed in the longitudinal direction of the terminal housing, and an antenna connecting and holding member to electrically connect the conductive tube with a printed circuit board;
   a communication antenna integrally attached to the TV antenna while being disposed coaxially to the TV antenna;
   contact connection members mounted below the communication antenna for disposing the TV antenna coaxially to the communication antenna; and
   an insulator formed in the longitudinal direction of the communication antenna part for isolating the TV antenna part and the communication antenna part from each other.

19. The unit as set forth in claim 18, wherein the contact connection members comprise:
   an insulating connection attached to the insulator; and
   a metal contact integrally attached to the insulating connection in the longitudinal direction of the insulating connection, the metal contact contacting the upper end of the conductive tube and a stopper of the retractable rod antenna.

20. The unit as set forth in claim 19, wherein the metal contact is provided with connection terminals, each of the connection terminals having a C-shaped member.

21. The unit as set forth in claim 18, wherein a stopper of the retractable rod antenna contacts the upper end of the conductive tube in the metal contact when the retractable rod antenna is fully extended.

22. The unit as set forth in claim 18, wherein the communication antenna comprises:
   a helical antenna disposed in the longitudinal direction of the antenna housing;
   a metal contact connection member connected the lower end of the helical antenna; and
   an antenna bushing connected to the contact connection member for connecting the helical antenna to a printed circuit board by means of a connection terminal.

23. The unit as set forth in claim 18, wherein the conductive tube comprises a copper pipe, and the conductive tube has one end disposed at the metal contact and the other end disposed adjacent to the lower end of the terminal housing.

24. The unit as set forth in claim 18, wherein the insulator is disposed in the metal contact.

25. The unit as set forth in claim 18, further comprising:
   a bobbin disposed opposite to the inner circumference of the antenna housing for isolating the communication antenna part and the TV antenna part from each other, the bobbin being a hollow member, through which the retractable rod antenna is retracted/extended.

26. The unit as set forth in claim 18, wherein the retractable rod antenna comprises:
   a first rod antenna member;
   a second rod antenna member extendable/retractable from/into the first rod antenna member;
   a third rod antenna member extendable/retractable from/into the second rod antenna member in the longitudinal direction thereof, the third rod antenna having elasticity in the direction perpendicular to the longitudinal direction; and
   a stopper attached to one end of the third rod antenna member.

27. The unit as set forth in claim 26, wherein the diameter of the first rod antenna member is greater than that of the second rod antenna member, and the diameter of the second rod antenna member is greater than that of the third rod antenna member.

28. The unit as set forth in claim 26, wherein the length of the first rod antenna member is less than that of the terminal housing, the length of the second rod antenna member is less than that of the first rod antenna member, and the length of the third rod antenna member is less than that of the second rod antenna member.

29. The unit as set forth in claim 18, wherein the TV antenna further comprises:
   connection terminals disposed in the metal contact, each of the connection terminals having a C-shaped member.

30. An antenna unit for portable communication terminals, comprising:
   a TV antenna including a retractable rod antenna retractable/extendable in the longitudinal direction of an antenna housing for receiving a TV signal, and a conductive tube connected to a stopper of the retractable rod antenna for transmitting the received TV signal;

a communication antenna coaxially surrounding the TV antenna for transmitting/receiving a communication signal;

a first insulator extending in the longitudinal direction of the communication antenna for isolating the TV antenna and the communication antenna from each other; and a first contact connection member integrally attached to the conductive tube in the longitudinal direction of the communication antenna for contacting the stopper of the retractable rod antenna and the end of the conductive tube below the communication antenna.

31. The unit as set forth in claim 30, wherein the first contact connection member comprises:

an insulating connection connected to the lower end of the first insulator; and a metal contact attached to the lower end of the insulating connection in the longitudinal direction thereof for contacting the upper end of the conductive tube and the stopper of the retractable rod antenna.

32. The unit as set forth in claim 31, wherein the metal contact is provided with first connection terminals each having a C-shaped member, thereby improving connectability with the stopper.

33. The unit as set forth in claim 30, further comprising: a second insulator attached to the lower end of the conductive tube.

34. The unit as set forth in claim 33, further comprising: a metal ground part attached to the lower end of the second insulator part.

35. The unit as set forth in claim 34, wherein the metal ground part is provided with second connection terminals each having a C-shaped member, thereby improving connectability.

36. The unit as set forth in claim 34, further comprising: a holding part attached to the lower end of the metal ground part, wherein the holding part is provided with a cylindrical protrusion inserted into the lower end of the metal ground part, the holding part being connected to the printed circuit board and comprises a metal material.

37. The unit as set forth in claim 30, wherein the conductive tube comprises a copper pipe, and the conductive tube has one end inserted in the first contact connection member disposed below the communication antenna and the other end disposed adjacent to the lower end of the terminal housing.

38. The unit as set forth in claim 30, wherein the communication antenna comprises:

a helical antenna disposed in the antenna housing in the longitudinal direction thereof;

a second contact connection member connected to the lower end of the helical antenna; and an antenna bushing connected to the second contact connection member for transmitting the communication signal to the printed circuit board of the terminal housing.

39. The unit as set forth in claim 30, further comprising:

an insulating bobbin disposed opposite to the inner circumference of the antenna housing for isolating the retractable rod antenna and the communication antenna part from each other, the bobbin being a hollow member for allowing the retractable rod antenna to be retracted/extended therethrough.

40. The unit as set forth in claim 30, wherein the retractable rod antenna comprises:

a first rod antenna member having an antenna cap attached to the upper end thereof;

a second rod antenna member extendable/retractable from/into the first rod antenna member, the second rod antenna member having a diameter less than that of the first rod antenna member;

a third rod antenna member extendable/retractable from/into the second rod antenna member, the third rod antenna member having a diameter less than that of the second rod antenna member;

a fourth rod antenna member extendable/retractable from/into the third rod antenna member, the fourth rod antenna member having a diameter less than that of the third rod antenna member, the fourth rod antenna member having elasticity in the direction perpendicular to the direction where the fourth rod antenna member is extended/retracted; and a stopper disposed to receive the end of the fourth rod antenna member.

41. The unit as set forth in claim 40, wherein the first rod antenna member comprises:

a conductive portion having a predetermined length; and an insulating portion extending from the conductive portion in the longitudinal direction thereof, the insulating portion being adjacent to the antenna cap.

42. The unit as set forth in claim 41, wherein the insulating portion has a length less than half of the length of the communication antenna.

43. The unit as set forth in claim 40, wherein the second rod antenna member has a length less than that of the conductive portion.

44. The unit as set forth in claim 30, wherein the first contact connection member is provided at the upper outer circumference thereof with a threaded portion, and the first insulator is provided at the lower inner surface thereof with another threaded portion.

45. The unit as set forth in claim 30, wherein the conductive tube is electrically connected to the printed circuit board by means of a connection terminal.

46. An antenna unit for portable communication terminals, comprising:

a retractable rod antenna retractable/extendable in the longitudinal direction of a communication antenna for receiving a TV signal;

a conductive tube connected to a stopper of the retractable rod antenna for transmitting the received TV signal, the conductive tube having a predetermined length;

a first insulator extending in the longitudinal direction of the retractable rod antenna and the communication antenna for isolating the retractable rod antenna and the communication antenna from each other;

a contact connection member integrally attached to the conductive tube in the longitudinal direction of the communication antenna for contacting the stopper of the retractable rod antenna and the end of the conductive tube below the communication antenna;

a second insulator attached to the lower end of the contact connection member;

a ground part attached to the lower end of the second insulator; and a connection terminal connected to the conductive tube for transmitting the received TV signal to a printed circuit board.

47. The unit as set forth in claim 46, wherein the contact connection member comprises:

an insulating connection part connected to the lower end of the first insulator; and a metal contact part attached to the lower end of the insulating connection part in the longitudinal direction thereof for contacting the upper end of the conductive tube and the stopper of the retractable rod antenna.

48. The unit as set forth in claim 47, wherein the metal contact part is provided with first connection terminals each having a C-shaped member, thereby improving connectability with the stopper, and wherein the ground part is provided with second connection terminals each having a C-shaped member, thereby improving connectability.

49. The unit as set forth in claim 46, further comprising:
a holding part attached to the lower end of the ground part, wherein the holding part is provided with a cylindrical protrusion inserted into the ground part, the holding part being connected to the printed circuit board and comprises a metal material.

50. The unit as set forth in claim 46, wherein the first contact connection member is provided at the upper outer circumference thereof with a threaded part, and the first insulator is provided at the lower inner surface thereof with another threaded part.

* * * * *